(12) United States Patent
Ogawa

(10) Patent No.: US 8,699,013 B2
(45) Date of Patent: Apr. 15, 2014

(54) CHROMATIC DISPERSION MEASUREMENT DEVICE AND CHROMATIC DISPERSION MEASUREMENT METHOD FOR MEASURING THE DISPERSION OF LIGHT PULSES

(71) Applicant: Fujikura Ltd., Tokyo (JP)

(72) Inventor: Kensuke Ogawa, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 13/864,787

(22) Filed: Apr. 17, 2013

(65) Prior Publication Data

US 2013/0229662 A1 Sep. 5, 2013

Related U.S. Application Data

(63) Continuation of application No. PCT/JP2011/073893, filed on Oct. 18, 2011.

(30) Foreign Application Priority Data

Oct. 18, 2010 (JP) .................................. 2010-233922

(51) Int. Cl.
*G01N 21/00* (2006.01)

(52) U.S. Cl.
USPC ............. 356/73.1; 356/477; 356/451; 398/29

(58) Field of Classification Search
USPC ................. 356/450–521, 73.1; 398/16, 39, 29
See application file for complete search history.

(56) References Cited

U.S. PATENT DOCUMENTS

| | | | |
|---|---|---|---|
| 5,956,131 A * | 9/1999 | Mamyshev et al. .......... | 356/73.1 |
| 5,969,806 A * | 10/1999 | Bergano ....................... | 356/73.1 |
| 6,760,112 B2 * | 7/2004 | Reed et al. .................... | 356/477 |
| 7,020,360 B2 * | 3/2006 | Satomura et al. ............... | 385/27 |

FOREIGN PATENT DOCUMENTS

| | | |
|---|---|---|
| JP | 2007-85981 A | 4/2007 |
| JP | 2011-102795 A | 5/2011 |
| JP | 2011-106984 A | 6/2011 |
| JP | 2011-179918 A | 9/2011 |

OTHER PUBLICATIONS

Victor Wong et al., "Analysis of ultrashort pulse-shape measurement using linear interferometers", Optics Letters, Feb. 15, 1994, pp. 287-289, vol. 19, No. 4.

Xin Chen et al., "Phase-shifting interferometry with uncalibrated phase shifts", Applied Optics, Feb. 1, 2000, pp. 585-591, vol. 39, No. 4.

International Search Report for PCT/JP2011/073893 dated Jan. 24, 2012.

* cited by examiner

*Primary Examiner* — Tarifur Chowdhury
*Assistant Examiner* — Michael P Lapage
(74) *Attorney, Agent, or Firm* — Sughrue Mion, PLLC

(57) ABSTRACT

Provided is a chromatic dispersion measurement device including a light branching unit that divides a incident measured light signal into a first measured light signal and a second measured light signal and causes a frequency difference between the first measured light signal and the second measured light signal when the signals are output, an optical phase shifter provided in either one of the first branch path and the second branch path having a polarization maintaining characteristic and periodically changing a phase $\alpha_i$ of the measured light signal, an optical combination unit that combines the first measured light signal and the second measured light signal and outputs an interference element of an i-th optical component obtained by interference of the first measured light signal and the second measured light signal when the phase difference is the phase $\alpha_i$, as a combined measured light signal.

13 Claims, 8 Drawing Sheets

CHROMATIC DISPERSION MEASUREMENT DEVICE AND CHROMATIC DISPERSION MEASUREMENT METHOD FOR MEASURING THE DISPERSION OF LIGHT PULSES

CROSS REFERENCE TO RELATED APPLICATIONS

This application is a continuation application based on a PCT Patent Application No. PCT/JP2011/073893, filed Oct. 18, 2011, whose priority is claimed on Japanese Patent Application No. 2010-233922, filed Oct. 18, 2010, the entire content of which are hereby incorporated by reference.

BACKGROUND OF THE INVENTION

1. Field of the Invention

The present invention relates to a field of technology such as a chromatic dispersion measurement device that measures chromatic dispersion of a light pulse. Specifically, the present invention relates to a chromatic dispersion measurement device that measures chromatic dispersion of a light pulse propagating through a light transmission line of an optical fiber network in a high-speed optical communication system whose transmission rate is tens of Gbit/s, and a chromatic dispersion measurement method using the same.

2. Description of the Related Art

In recent years, data communication has shifted to communication via optical fibers and accordingly, a data transmission rate has become much higher than a conventional data transmission rate. In the near future, performing communication at a transmission rate of tens of Gbit/s or more, which is higher than current transmission rates, using an ultrashort light pulse will be considered in such a high-speed optical communication system via the optical fiber.

There is a problem in which crosstalk or a transmission error is always generated when data communication is performed in a high-speed optical communication system.

However, as the data transmission rate increases, a width of an individual light pulse and an interval of successive light pulses become narrow and the crosstalk or the transmission error described above becomes a very important issue, as will be described below, when high-reliability data communication is performed.

A speed at which light propagates through a material depends on a refractive index of the material, and as the refractive index increases, the speed of the light decreases. In materials such as glass, semiconductors or optical crystals, the refractive index changes with a frequency of the light (a wavelength in the air), and thus the light speed depends on the wavelength. It is known that, due to the wavelength dependence of the refractive index, a waveform of the light pulse is distorted and a time width of the light pulse is spread while a light pulse propagates through the material. Further, in an optical waveguide whose representative example is an optical fiber, an effective refractive index of the optical waveguide is determined according to a shape and a dimension of each of a core and a clad, and the speed of the light depends on the wavelength. Accordingly, a structure of the optical waveguide causes spreading of a time width of the light pulse. As described above, a characteristic that the light speed depends on the wavelength of the light is hereinafter called chromatic dispersion or simply dispersion.

The waveform of the light pulse is distorted or the time width of the light pulse is widened while the light pulse propagates through the optical fiber due to the above chromatic dispersion as described above, but this is not a particularly great problem since both the width of the light pulse and an interval of successive light pulses are wide at a conventional transmission rate in comparison with the chromatic dispersion.

However, when the data transmission rate is as high as tens of Gbit/s or more, the chromatic dispersion becomes wider than the interval of successive light pulses and crosstalk or a transmission error is generated. For example, successive light pulses interfere with each other. Accordingly, high-reliability data communication cannot be realized at a higher speed by an attempt to simply increase the transmission rate with current technology.

In order to remove (or control) the chromatic dispersion in the high-speed optical communication system described above, first, it is necessary to measure chromatic dispersion of various optical components used in the high-speed communication system and recognize a chromatic dispersion characteristic of each member.

For example, there is a chromatic dispersion measurement device that uses a spectral shearing interferometer using a frequency shifter, which measures spectral phases of various components in order to obtain chromatic dispersion from a change in the spectral phase (e.g., see Japanese Unexamined Patent Application, First Publication, No. 2007-085981).

In the spectral shearing interferometer, the interferometer is configured using a space optical system since two orthogonal components are simultaneously measured by converting cos and sin components of a light pulse into horizontal and vertical polarization components, respectively, and performing polarization division, to uniquely measure the spectral phase.

In the spectral shearing interferometer, a light pulse is propagated by linear polarization in an optical fiber constituting a part of the interferometer.

In the spectral shearing interferometer, it is necessary to convert linear polarization into circular polarization in order to generate the two orthogonal components of the cos component and the sin component.

The circular polarization is formed by superposition of two orthogonal polarizations of horizontal polarization and vertical polarization that are orthogonal vertically and horizontally. There is a phase difference of 90° between the horizontal polarization and the vertical polarization.

Accordingly, the two orthogonal components, i.e., the cos component and the sin component, can be obtained by spatially dividing the circular polarization into the horizontal polarization and the vertical polarization using a polarization beam splitter.

As described above, it is necessary to obtain the two orthogonal components of the cos component and the sin component in a plurality of wavelength bands for the measurement of the chromatic dispersion.

On the other hand, in the optical fiber, only light having a specific wavelength according to an optical length of the optical fiber is propagated without being changed from circular polarization to elliptical polarization, and light having other wavelengths is propagated with a change from the circular polarization to the elliptical polarization. Accordingly, the two orthogonal components cannot be maintained in a stable state and cannot be obtained with high accuracy.

Accordingly, the space optical system is used on an optical path related to the division of the two orthogonal components so that the circular polarization is not changed into the elliptical polarization. Light having all corresponding wavelengths propagate in a stable circular polarization and the two orthogonal components, i.e., the cos component and the sin component, are generated with high accuracy.

However, although the chromatic dispersion measurement device of Japanese Unexamined Patent Application, First Publication, No. 2007-085981 can accurately obtain the two orthogonal components of the light pulse, the chromatic dispersion measurement device uses the space optical system and light loss is generated by light input and output between the optical fiber and the space optical system. The light loss degrades intensity of the light and reduces measurement sensitivity.

Further, since the chromatic dispersion measurement device of Japanese Unexamined Patent Application, First Publication, No. 2007-085981 uses the space optical system, a configuration of the device becomes complicated and cannot be miniaturized due to an arrangement of parts necessary for the space optical system.

Further, since the chromatic dispersion measurement device of Japanese Unexamined Patent Application, First Publication, No. 2007-085981 can obtain the two orthogonal components through selection of the polarization using the space optical system, it is difficult to extend an optical system to generate a plurality of phase components rather than the two orthogonal components, such as three phase components whose phase angles are 0, $\pi$ and $\alpha$ in radians. Here, $\alpha$ indicates any phase angle between 0 and $\pi$, that is, greater than 0 and smaller than $\pi$.

A non-interference component (a non-interference optical component, which corresponds to a DC component) that is a background component that degrades the accuracy of the chromatic dispersion characteristic can be removed through a mathematical operation using the three phase components 0, $\pi$ and $\alpha$ described above.

However, in the chromatic dispersion measurement device of Japanese Unexamined Patent Application, First Publication, No. 2007-085981, only the two orthogonal components of 0 and $\pi$ can be generated and no phase component with a phase angle $\alpha$ can be generated.

Accordingly, in the chromatic dispersion measurement device of Japanese Unexamined Patent Application, First Publication, No. 2007-085981, in order to remove the non-interference component, it is necessary to optimize the interferometer so that light intensity distributions in respective branch paths of the interferometer are always 50:50. Accordingly, a stabilizing mechanism for always maintaining the light intensity distributions in the branch paths to be 50:50 is necessary, and the device becomes complicated and large. Thus, it is difficult to realize a small chromatic dispersion measurement device.

SUMMARY

The present invention has been made in view of the circumstances described above, and an object of the present invention is to provide, for example, a chromatic dispersion measurement device capable of being miniaturized and realizing measurement of chromatic dispersion of a light pulse reliably and with high stability without being affected by a non-interference component.

A chromatic dispersion measurement device in accordance with a first aspect of the present invention includes: an incident path that propagates a measured light signal incident from a measurement target, the incident path including an optical fiber having a polarization maintaining characteristic; a light branching unit configured to receive the measured light signal from a first input end connected to the incident path, divide the measured light signal incident from the input end into a first measured light signal and a second measured light signal, output the first measured light signal from a first output end and the second measured light signal having the same polarization direction as the first measured light signal from a second output end, and cause a frequency difference between the first measured light signal and the second measured light signal when the signals are output; a first branch path connected to the first output end, the first branch path propagating the first measured light signal, the first branch path including an optical fiber having a polarization maintaining characteristic; a second branch path connected to the second output end, the second branch path propagating the second measured light signal, the second branch path including an optical fiber having a polarization maintaining characteristic; an optical phase shifter provided in either one of the first branch path and the second branch path, the optical phase shifter periodically changing a phase $\alpha_i$ (in radians; $\alpha_i$ is a real number for which $0 \leq \alpha_i \leq 2\pi$, while i is an integer for which $3 \leq i$) of the measured light signal propagating through the branch path in which the optical phase shifter is provided; an optical combination unit configured to combine the first measured light signal incident from a second input end connected to the first branch path and the second measured light signal incident from a third input end connected to the second branch path, the optical combination unit outputting an interference element of an i-th optical component obtained by interference of the first measured light signal and the second measured light signal when the phase difference is the phase $\alpha_i$, as a combined measured light signal, from a third output end; a combination path connected to the third output end, the combination path including an optical fiber that propagates the combined measured light signal; a light frequency sweep unit configured to receive the combined measured light signal from a fourth input end connected to the combination path, perform sweep of a frequency in a frequency range for passing the combined measured light signal, perform frequency decomposition to extract a spectral component in the frequency range from the combined measured light signal, and output the result of the frequency decomposition as a measured component light signal from a fourth output end; an output light path connected to the fourth output end, the output light path including an optical fiber that propagates the measured component light signal; a light detection unit configured to receive the measured component light signal from a fifth input end connected to the output light path, converts the measured component light signal into an electrical signal, and uses the conversion result as an interference signal; and a control unit configured to perform a process of sequentially acquiring the interference signal corresponding to the i-th optical component in order of increase of i in one period in which the phase of the phase shifter is changed in synchronization with a change in a phase of the optical phase shifter each time the sweep in the frequency range is performed.

In the chromatic dispersion measurement device, when a range of acquired values of i is m, the control unit may set the number of data points of all interference signals to m times by performing an interpolation process in which a measurement interval for each frequency component is 1/m, on each of the i-th optical components.

In the chromatic dispersion measurement device, a total number of elements of a, may be equal to or greater than 3 ($i \geq 3$), and the control unit may be configured to extract, from the elements, a first optical component of a phase $\alpha_1$, a second optical component of a phase $\alpha_2$ and a third optical component of a phase $\alpha_3$ as three elements, and acquire the interference signal from each of the first optical component, the second optical component and the third optical component.

In the chromatic dispersion measurement device, a total number of elements of a, may be equal to or greater than 20 (i≥20).

The chromatic dispersion measurement device may further include: a light delay unit provided in either one of the first branch path and the second branch path, the light delay unit being configured to adjust an optical path length difference between the first branch path and the second branch path.

In the chromatic dispersion measurement device, the light delay unit may be provided in either one of the first branch path and the second branch path, and the optical phase shifter may be provided in the other branch path.

In the chromatic dispersion measurement device, the light delay unit and optical phase shifter may be integrally provided in either one of the first branch path and the second branch path.

In the chromatic dispersion measurement device, the control unit may include: a first receiving unit configured to receive the interference signal of the first optical component; a second receiving unit configured to receive the interference signal of the second optical component; and a third receiving unit configured to receive the interference signal of the third optical component.

In the chromatic dispersion measurement device, the control unit may be configured to sequentially acquire, as a measurement unit, the first optical component, the second optical component, and the third optical component as a data set in each sweep of a measurement frequency in a measurement range.

The chromatic dispersion measurement device may further include: a calibration light source that outputs calibration light; and a light input switching unit configured to receive the combined light signal output from the output end of the light combination unit from a sixth input end via an optical fiber, receive the calibration light from a seventh input end, and select either one of the combined light signal and the calibration light to output the one of the combined light signal and the calibration light from the fifth output end. The light input switching unit may be interposed between the light combination unit and the light frequency sweep unit, and the one of the combined light signal and the calibration light output from the light input switching unit may be input to the fourth input end of the frequency sweep unit via an optical fiber.

In the chromatic dispersion measurement device, the combination path may include an optical fiber having a polarization maintaining characteristic, a controller that controls the polarization direction of the combined measured light signal may be inserted in a subsequent stage of the combination path, and the polarization controller and the light frequency sweep unit may be connected to each other by an optical fiber having a polarization maintaining characteristic.

In a chromatic dispersion measurement method of obtaining chromatic dispersion of a measurement target by using any one of the above-described chromatic dispersion measurement device, the chromatic dispersion in the measurement target may be evaluated by: providing a branch unit in a portion for evaluating chromatic dispersion of a light transmission line that is the measurement target; controlling, by a polarization control unit, polarization of the measured light signal obtained by the branch unit to be linear polarization and to be aligned with a polarization axis propagating through the chromatic dispersion measurement device; inputting a measured light signal to the chromatic dispersion measurement device via the incident path; and obtaining a spectral phase change of the measured light signal from the interference signal of the first optical component, the second optical component and the third optical component.

In a chromatic dispersion measurement method of obtaining chromatic dispersion of a measurement target by using any one of the above-described chromatic dispersion measurement device, the chromatic dispersion in the measurement target may be evaluated by: inputting a light signal subjected to polarization control to an input end of the measurement target whose chromatic dispersion is to be evaluated; controlling polarization of the measured light signal output from an output end of the measurement target to be linear polarization and to be aligned with a polarization axis propagating through the chromatic dispersion measurement device; inputting a measured light signal to the chromatic dispersion measurement device via the incident path; and obtaining the spectral phase change of the measured light signal from the interference signal of the first optical component, the second optical component and the third optical component.

In a chromatic dispersion measurement method of obtaining chromatic dispersion of a measurement target by using any one of the above-described chromatic dispersion measurement device, a light signal subjected to polarization control may be input to an input end of the measurement target whose chromatic dispersion is to be evaluated, polarization of the measured light signal output from an output end of the measurement target may be controlled to be linear polarization and to be aligned with a polarization axis propagating through the chromatic dispersion measurement device, a light signal of a single wavelength channel may be extracted as a measured light wavelength signal from the measured signal when the measurement target includes a plurality of multiplexed wavelength channels, and the chromatic dispersion of a measurement target of each wavelength channel may be evaluated based on the measured light wavelength signal in the chromatic dispersion measurement device.

According to the above-described aspect of the present invention, since the interferometer of the chromatic dispersion measurement device is configured of the first branch path and the second branch path of the optical fiber having a polarization maintaining characteristic without using the space optical system, the light loss caused by light input and output between the optical fiber and the space optical system is not generated and intensity of the light of the measured light signal is not degraded, unlike the conventional example.

Further, according to the above-described aspect of the present invention, the measured light signal propagates through the device in a state in which the polarization of the measured light signal is maintained by the optical fiber having the polarization maintaining characteristic, and a phase difference between the first measured light signal propagating through the first branch path among the first branch path and the second branch path constituting the interferometer and the second measured light signal propagating through the second branch path is sequentially periodically switched between 0 and π in radians. Accordingly, the interference element can be extracted from the i-th optical component having a different phase shift amount, from the first and second measured light signals in the same stable polarization state, and the measurement of the chromatic dispersion of the light pulse can be performed with high accuracy and high sensitivity in comparison with a conventional example.

Furthermore, according to the above-described aspect of the present invention, since the space optical system is not used, the configuration of the device can be simplified, an arrangement of parts for the space optical system is unnecessary, and the device can be miniaturized.

DETAILED DESCRIPTION OF THE PREFERRED EMBODIMENT

Figure 1A:
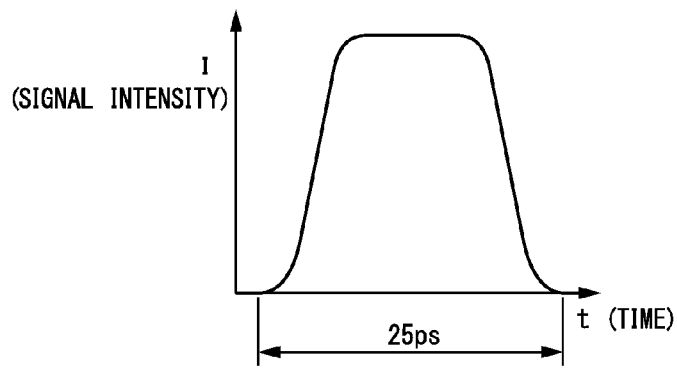
FIG. 1A is a diagram illustrating measurement of a change $\Delta\phi(v)$ in a spectral phase from a light pulse.

Hereinafter, preferred embodiments of the present invention will be described with reference to the accompanying drawings. Further, the present embodiment, for example, is a preferred embodiment in which the present invention is applied to a chromatic dispersion measurement device for evaluating a chromatic dispersion characteristic of a light pulse propagating through an optical fiber transmission line of an optical network with wavelength multiplexing transmission, such as an optical fiber trunk transmission line between Tokyo and Osaka, a metro optical fiber network in an urban area, or the like, and to a chromatic dispersion measurement method using the chromatic dispersion measurement device.

Chromatic Dispersion

First, chromatic dispersion measured by the chromatic dispersion measurement device in the present embodiment will be described.

In the present embodiment, a spectral phase of a light pulse propagating through an optical fiber transmission line is measured and characteristic evaluation for chromatic dispersion occurring in an optical fiber transmission line is performed, as described above. In particular, a preferred embodiment suitable when characteristic evaluation for chromatic dispersion of an optical fiber transmission line used in a 10 GBit/s to 40 GBit/s high-speed optical communication system is performed will be described.

A relationship of a frequency and a wavenumber, that is, a dispersion relationship, is important in evaluation of the chromatic dispersion of the optical fiber transmission line. From this relationship, speed when light propagates through the optical fiber transmission line is obtained. This speed refers to a moving speed of a center of a light pulse and is called a "group speed." Wavelength (frequency) dependence of the group speed indicates the chromatic dispersion.

This group speed is given as a slope (differentiation coefficient) of a frequency-wavenumber characteristic curve. In vacuum or air, the frequency-wavenumber characteristic becomes linear and the group speed is constant irrespective of the frequency. However, in a material such as glass, a semiconductor or a metal, the frequency-wavenumber characteristic is not linear and the group speed changes with the frequency. Since the optical fiber transmission line through which the light pulse propagates is mainly formed of glass, chromatic dispersion is generated according to a characteristic of the glass and shapes and dimensions of a core and a clad, and the group speed changes with the frequency (or the wavelength) of the light pulse.

Here, the light pulse contains a single wavelength, as well as various wavelength components. Accordingly, when the group speed depends on a wavelength, the width of the light pulse is spread as the light pulse propagates through the optical fiber transmission line, the waveform of the light pulse is distorted, and signals of successive light pulses overlap, which causes crosstalk and an error.

Since the chromatic dispersion increases in proportion to a length of a medium such as an optical fiber through which the light pulse propagates, the distortion of the light pulse is greatly spread, which is a serious problem, as an optical network becomes popular and the length of a path configured of an optical fiber or an optical part increases.

For this reason, compensation for the chromatic dispersion becomes an important issue when the optical network is built and operated. In order to compensate for the chromatic dispersion, it is necessary to evaluate a degree of the chromatic dispersion.

A dispersion parameter D that is a characteristic of the chromatic dispersion of the optical fiber transmission line is represented by the following Equation (1). A unit of the dispersion parameter is, for example, ps/nm/km. In Equation (1), $\Delta\tau_g$ denotes a group delay time difference, L denotes a light propagation distance, and $\Delta\lambda$ denotes a wavelength difference.

$$D = \frac{\Delta\tau_g}{L\Delta\lambda} \tag{1}$$

In the present embodiment, the dispersion parameter D is, for example, a length of an optical fiber transmission line or an optical part. The light propagation distance L is known. Accordingly, if a group delay time difference with respect to the wavelength difference is obtained, the dispersion parameter D can be calculated.

The above wavelength difference is represented as the following Equation (2) using a frequency difference $\Delta v$. In Equation (2), $v$ denotes a frequency and $c$ denotes the speed of light.

$$\Delta \lambda = -\frac{c\Delta v}{v^2} \quad (2)$$

The following Equation (3) is obtained by applying Equation (2) to Equation (1).

$$D = -\frac{v^2 \Delta \tau_g}{cL\Delta v} \quad (3)$$

However, the frequency of the light is very high, and it is impossible to measure the vibration of an electric field of the light through electrical measurement with current technology, for example, since a frequency of the light having a wavelength 1500 nm corresponds to 200 THz (Terahertz). In this case, an interferometer is used as a means for measuring the phase of the light.

In the interferometer, incident light is divided in two directions by a beam splitter, and respective lights pass through independent paths and are combined into one again. A phase difference due to the divided lights propagating through the respective paths can be measured as the intensity of interference light after the combination.

Accordingly, in the present embodiment, a part of a light pulse propagating through the optical fiber transmission line is extracted, the extracted part of the light pulse is frequency-shifted by $\Delta v_0$ by a frequency shifter (AOFS: acousto-optic frequency shifter), and interference fringe obtained by interference with the original light pulse is subjected to polar coordinate conversion in intensity and phase using the resultant light pulse, such that frequency differentiation of the phase of the original light pulse can be obtained and the group delay time can be measured.

Hereinafter, a description will be given in greater detail with reference to the accompanying drawings.

FIG. 1A is a diagram showing a waveform of a light pulse propagating through an optical fiber transmission line, and is a time waveform of the light pulse in which a horizontal axis indicates time t, and a vertical axis indicates signal intensity I. In the example shown in FIG. 1A, the light pulse is assumed to be a light pulse that is repeatedly ON or OFF every 25 ps (40 Gbit/s). When a spectral phase after propagating through the optical fiber transmission line or the optical part is $\phi(v)$ and a change of a spectral phase relative to a frequency difference of $\Delta v$ is $\Delta\phi(v)$, the group delay time difference $\Delta\tau_g$ is represented by the following Equation (4). Here, the spectral phase is generally called a light pulse chirp and describes a change in phase as a function of a frequency. Here, the spectral phase indicates the phase change generated by the optical fiber transmission line.

$$\Delta \tau_g = \frac{1}{2\pi}\frac{\partial \phi}{\partial v} = \frac{1}{2\pi}\frac{\Delta \phi(v)}{\Delta v} \quad (4)$$

When Equation (4) is applied to Equation (3), a relational equation indicated by the following Equation (5) is derived.

$$D = -\frac{1}{2\pi c}\frac{\Delta\phi(v)}{L}\left(\frac{v}{\Delta v}\right)^2 \quad (5)$$

The dispersion parameter D in the optical fiber transmission line or the optical part can obtained and the chromatic dispersion can be evaluated by obtaining a change in the spectral phase in the frequency difference $\Delta v$ with respect to the light pulse propagating through the optical fiber transmission line or the optical part using Equation (5). Since higher-order chromatic dispersion such as a dispersion slope is represented as frequency dependence of the dispersion parameter, all-order chromatic dispersion may be evaluated according to Equation (5).

Figure 1B:
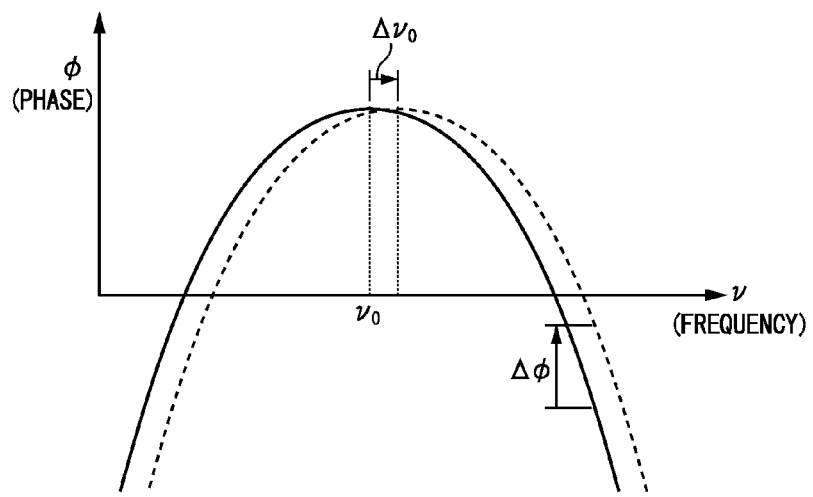
FIG. 1B is a diagram illustrating measurement of a change $\Delta\phi(\nu)$ in a spectral phase from a light pulse.

Further, FIG. 1B shows a dependence characteristic of a phase of a light pulse on a frequency $v$. The light pulse of an optical fiber transmission line, which is a measurement target, has second-order dispersion, and the phase is changed as indicated by a parabola having a convex shape, as shown in FIG. 1B. When the frequency is slightly shifted by $\Delta v_0$, a spectral phase is changed by $\Delta\phi$ due to this shift as indicated by a dotted line in FIG. 1B. The value of the change $\Delta\phi$ of the spectral phase is equal to a value obtained by differentiating the original light pulse (a solid line in FIG. 1B) that is not frequency-shifted. Accordingly, a group delay time difference $\Delta\tau_g$ can be obtained by dividing the change $\Delta\phi$ of the spectral phase with the frequency shift amount $\Delta v_0$, as shown in Equation (4).

Spectral Shearing Interferometer

In a spectral shearing interferometer, an input light pulse is branched into two with the same polarization directions by two branch paths included in the interferometer, and the light pulse propagating through any one of the branch paths is frequency-shifted.

Figure 1C:
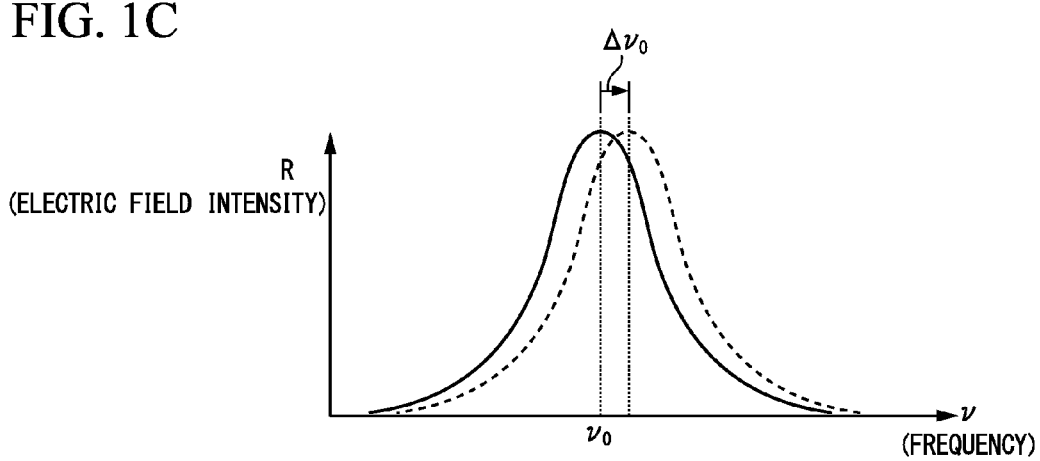
FIG. 1C is a diagram illustrating measurement of a change $\Delta\phi(\nu)$ in a spectral phase from a light pulse.

FIG. 1C shows an intensity spectrum waveform of the light pulse. FIG. 1C shows a characteristic of dependence of a frequency $v$ on an electric field R. It can be seen that an original light pulse that is not frequency-shifted has a spectrum in which an electric field R has a maximum (peak) at a center frequency $v_0$, as shown by a solid line. On the other hand, it can be seen that, when the frequency is slightly shifted by $\Delta v_0$ (as shown by a dotted line), the peak of the intensity spectrum is shifted, but the waveform is not changed. That is, since the value of the electric field R is not changed even when the frequency is slightly shifted, a power spectrum of the original light pulse indicated as an absolute value can be approximated by a power spectrum of the light pulse whose frequency has been slightly shifted by $\Delta v_0$.

Accordingly, a spectrum of an interference fringe generated due to the frequency shift can be acquired and the change $\Delta\phi(v)$ of the spectral phase with respect to the frequency difference $\Delta v$ shown in FIG. 1B can be measured as a value equivalent to a value obtained by differentiating the light pulse. As a result, a dispersion parameter can be derived and the chromatic dispersion can be evaluated by applying the obtained change $\Delta\phi(v)$ of the spectral phase to Equation (5). Details of the spectral shearing interferometer are disclosed in OPTICS LETTERS Vol. 19, No. 4, pp. 287-289, Feb. 15, 1994, "Analysis of ultrashort pulse-shape measurement using linear interferometers"), Victor Wong and Ian Walmsley.

Hereinafter, in addition to the configuration shown in the above Document, first, a basic principle of evaluating the chromatic dispersion in a spectral shearing interferometer in accordance with the present embodiment, including unique phase measurement, by detecting two orthogonal components on the assumption that there is no non-interference component that is a background component will be described. Next, a method of obtaining two orthogonal components by removing a non-interference component that is a background component with phase components (optical components) measured using phase shift as 0, π and α in radians when there is the non-interference component will be described ("Removal of Non-interference Component Overlapped with Interference Component," which will be described later).

A light pulse propagating through the optical fiber transmission line or the optical part that is a chromatic dispersion evaluation target is a measured light signal, and the measured light signal is divided into two branch paths by a light branching unit in a state in which the same polarization directions are maintained. The interferometer is configured so that the measured light signal propagating through one of the two branch paths is phase-shifted by π/2, and the measured light signals propagating through two branch paths, such as the first measured light signal propagating through the first branch path and the second measured light signal propagating through the second branch path, are combined.

A time waveform of an electric field of the first measured light signal propagating through the first branch path is represented by the following Equation (6). In Equation (6), t denotes time, and $v_0$ denotes a center frequency of the measured signal.

$$\begin{pmatrix} E_1^{cos}(t) \\ E_1^{sin}(t) \end{pmatrix} = \begin{pmatrix} |E_1^{cos}(t)|\exp[-i\{2\pi v_0 t - \psi\}] \\ |E_1^{sin}(t)|\exp[-i\{2\pi v_0 t - \psi\}] \end{pmatrix} \quad (6)$$

In Equation (6), a time waveform of the first measured light signal indicating the two orthogonal components is shown. An upper row shows a cos component that is one of the two orthogonal components, and a lower row shows a sin component that is the other of the two orthogonal components. Further, each of $|E_1^{cos}(t)|$ and $|E_1^{sin}(t)|$ indicates an absolute value of an envelope of the electric field. Here, the cos component that is a first optical component in the first measured light signal and the sin component that is a second optical component having a phase difference of π/2 from the cos component have the same polarization direction.

ψ is a phase in a time domain notation and contains a term related to the chromatic dispersion. Further, in Equation (6), a phase component dependent on a signal modulation format is omitted.

In the spectrum interferometer, the time waveform of the electric field of Equation (6) is subjected to spectroscopy, that is, a Fourier transform, to be converted into a spectrum having the center frequency $v_0$ as an origin. The following Equation (7) is obtained.

$$\begin{pmatrix} E_1^{cos}(v) \\ E_1^{sin}(v) \end{pmatrix} = \begin{pmatrix} |E_1^{cos}(v)|\exp[-i\phi(v)] \\ |E_1^{sin}(v)|\exp[-i\phi(v)] \end{pmatrix} \quad (7)$$

Next, the center frequency $v_0$ of the second measured light signal propagating through the second branch path is frequency-shifted by $\Delta v_0$. The frequency shift $\Delta v_0$ is small and there is a relationship of $v_0 \gg \Delta v_0$. Further, the time waveform of the electric field of the second measured light signal propagating through the second branch path is represented by the following Equation (8). The phase difference of the cos component in the second measured light signal relative to the first measured light signal is 0° and the phase difference of the sin component is 90°. Accordingly, a phase difference π/2 is added to the sin component. Here, in order to obtain a power spectrum of an interference component (interference fringe) by the sin component, a phase difference of π/2 is applied to the second measured light signal and used as the sin component. Further, the cos component that is a first optical component and the sin component that is a second optical component in the second measured light signal and has a phase difference of π/2 from the cos component have the same polarization direction.

$$\begin{pmatrix} E_2^{cos}(t) \\ E_2^{sin}(t) \end{pmatrix} = \begin{pmatrix} |E_2^{cos}(t)|\exp[-i\{2\pi(v_0 + \Delta v_0)t - \psi\}] \\ |E_2^{sin}(t)|\exp[-i\{2\pi(v_0 + \Delta v_0)t - \psi + \pi/2\}] \end{pmatrix} \quad (8)$$

When Equation (8) described above is subjected to a Fourier transform to be converted into a spectrum having the center frequency $v_0$ as an origin, the following Equation (9) is obtained.

$$\begin{pmatrix} E_2^{cos}(v) \\ E_2^{sin}(v) \end{pmatrix} = \begin{pmatrix} |E_2^{cos}(v)|\exp[-i\phi(v - \Delta v_0)] \\ |E_2^{sin}(v)|\exp[-i\{\phi(v - \Delta v_0) + \pi/2\}] \end{pmatrix} \quad (9)$$

Since the frequency shift $\Delta v_0$ is small as described above, an approximate equation of the following Equation (10) is applied to each of the cos component and the sin component in Equation (9).

$$|E_2^{cos/sin}(v - \Delta v_0)| = |E_2^{cos/sin}(v)| \quad (10)$$

The first measured light signal propagating through the first branch path and the second measured light signal propagating through the second branch path are combined again by a combination unit. When the combined measured light signal is detected by a light detection unit, a power spectrum by interference of the first measurement light signal and the second measured light signal is obtained. Power spectra of the interference components of the cos component and the sin component after the recombination are |E cos(v)| and |E sin(v)|, respectively, and respective cos components or sin components of the first measured light signal and the second measured light signal having the same polarization direction in the electric field spectrum of Equations (7) and (9) are overlapped to obtain the square of the absolute value. Accordingly, the power spectrum of each of the interference component of the cos component and the interference component of the sin component is obtained as the following Equation (11).

$$\begin{pmatrix} |E^{cos}(v)|^2 \\ |E^{sin}(v)|^2 \end{pmatrix} = \begin{pmatrix} |E_1^{cos}(v)|^2 + |E_2^{cos}(v)|^2 + 2|E_1^{cos}(v)| \cdot |E_2^{cos}(v)|\cos[\Delta\phi(v)] \\ |E_1^{sin}(v)|^2 + |E_2^{sin}(v)|^2 + 2|E_1^{sin}(v)| \cdot |E_2^{sin}(v)|\sin[\Delta\phi(v)] \end{pmatrix} \quad (11)$$

In the above Equation (11), the frequency shift $\Delta v_0$ is regarded as being the same as the frequency difference $\Delta v$ in Equations (4) and (5), and a term indicating a phase difference is assumed to be the same as the change $\Delta\phi(v)$ of the spectral phase with respect to the frequency difference $\Delta v$, as in the following Equation (12).

$$\phi(v - \Delta v_0) - \phi(v) = \Delta\phi(v) \quad (12)$$

Next, terms of the cos component and the sin component corresponding to the change $\Delta\phi(v)$ of the spectral phase are obtained as shown in the following Equation (13) by changing Equation (11). Here, when the above recombination is performed, the polarization directions of the first measured light signal and the second measured light signal are the same and the polarization directions of the cos components and the sin components in the first measured light signal and the second measured light signal are also the same.

$$\begin{pmatrix} \cos[\Delta\phi(v)] \\ \sin[\Delta\phi(v)] \end{pmatrix} = \begin{pmatrix} \dfrac{|E^{cos}(v)|^2 - |E_1^{cos}(v)|^2 - |E_2^{cos}(v)|^2}{2|E_1^{cos}(v)| \cdot |E_2^{cos}(v)|} \\ \dfrac{|E^{sin}(v)|^2 - |E_1^{sin}(v)|^2 - |E_2^{sin}(v)|^2}{2|E_1^{sin}(v)| \cdot |E_2^{sin}(v)|} \end{pmatrix} \quad (13)$$

Interference fringe components in the interference of the cos component and the sin component in the first measured light signal and the second measured light signal are contained in $|E\cos(v)|$ and $|E\sin(v)|$ in Equation (13).

Further, in the present embodiment, when the recombination of the first measured light signal and the second measured light signal is performed in order to obtain the above Equation (13), either one of the first measured light signal and the second measured light signal is alternately phase-shifted to 0° and 90° with respect to the other measured light signal. This shift of the phase is performed by alternately applying, in time, a phase shift voltage, which is a voltage for controlling the shift amount of the phase, to a light phase shift unit that is an optical phase shifter. Further, even after the shift of the phase is performed, the polarization directions of the first measured light signal and the second measured light signal are the same.

As a result, the cos component (top) and the sin component (bottom) in the measured signal in Equation (8) are alternately acquired. In the present embodiment, the light phase shift unit is provided in the second branch path to alternately change a phase difference of the second measured light signal propagating through the second branch path relative to the phase of the first measured light signal propagating through the first branch path into two values: 0° (cos component acquisition) and 90° (sin component acquisition) using the applied phase shift voltage, as described above. As a result, in the combination of the first measured light signal and the second measured light signal, the interference component of the cos component and the interference component of the sin component are alternately acquired. Also, power spectra of the alternately acquired interference components of the pair of cos component and sin component are applied to the following Equation (14) to uniquely obtain the change $\Delta\phi(v)$ of the spectral phase with respect to the frequency difference $\Delta v$ in a range of 0 to $2\pi$ using $\tan^{-1}$ of a single-valued function. Here, the pair of cos component and sin component is a unit in which the change $\Delta\phi(v)$ of the spectral phase is obtained at each frequency.

$$\Delta\phi(v) = \tan^{-1}\left[\dfrac{\sin[\Delta\phi(v)]}{\cos[\Delta\phi(v)]}\right] = \tan^{-1}\left[\dfrac{|E^{sin}(v)|^2 - |E_1^{sin}(v)|^2 - |E_2^{sin}(v)|^2}{|E^{cos}(v)|^2 - |E_1^{cos}(v)|^2 - |E_2^{cos}(v)|^2}\right] \quad (14)$$

In Equation (14), powers of the cos component and the sin component in each of the first measured light signal propagating through the first branch path and the second measured light signal propagating through the second branch path are assumed to be the same and the following Equation (15) is applied to obtain an expression on the rightmost side.

$$|E_{1,2}^{cos}(v)| = |E_{1,2}^{sin}(v)| \quad (15)$$

Since the change $\Delta\phi(v)$ of the spectral phase is periodically warped in a range of 0 to $2\pi$, the warp of the phase is released through development using an unwrap process.

By doing so, the change $\Delta\phi(v)$ of the spectral phase with respect to the frequency difference $\Delta v$ is measured using the spectral shearing interferometer and applied to Equation (5) to derive the dispersion parameter D and the evaluation of the chromatic dispersion characteristic in the optical fiber transmission line is performed.

Meanwhile, in the measurement of the dispersion parameter D using the spectrum interferometer, the dispersion parameter D can be calculated by frequency-differentiating the measured spectral phase $\phi(v)$ to obtain a group delay time. However, if the frequency differentiation is performed, a measurement noise in the spectral phase is simultaneously differentiated, a sharp spike noise resulting from the measurement noise differentiation is overlapped with the group delay time and the accuracy of dispersion parameter calculation is degraded.

As described above, the spectrum interferometer has a drawback in that the dispersion parameter cannot be accurately detected. Accordingly, in the present invention, the chromatic dispersion is evaluated with high accuracy by measuring the change $\Delta\phi(v)$ of the spectral phase with respect to the frequency difference $\Delta v$ using the spectral shearing interferometer.

Removal of Non-Interference Component Overlapped with Interference Component

In the above-described "Spectral Shearing Interferometer," power after the combination of the first measured light signal propagating through the first branch path and the second measured light signal propagating through the second branch path is the same in deriving Equation (11) representing the power spectrum of each of the interference component of the cos component and the interference component of the sin component. That is, although already described in paragraphs related to the derivation of Equation (11), it is assumed that the branching ratio and the combination ratio of the spectral shearing interferometer are both 50:50 and there is no non-interference component, which is a background component of the interference fringe.

In order to obtain a state in which the non-interference component is actually absent, the branching ratio and the combination ratio are required to be always maintained at 50:50 with respect to different wavelengths, and a design of a spectral shearing interferometer that is very special as a configuration is necessary in consideration of wavelength dependence of all elements constituting the spectral shearing interferometer.

In the spectral shearing interferometer having such a special configuration, constituent elements become complicated and the number of components increases. Accordingly, the device becomes larger and is not desirable in practical use. Further, a stabilizing mechanism for suppressing a variation of a path length of the spectral shearing interferometer due to thermal expansion of the component or a variation of a refractive index of the component due to a thermo-optic effect by maintaining constant temperature so that the branching ratio and the combination ratio do not vary (shake) is necessary.

However, a non-interference component that is a background component that degrades the accuracy of the chromatic dispersion characteristic can be removed by a mathematical operation using three phase components.

Accordingly, the phase shift occurring in the phase shifter is not limited to the two values of 0 and π/2 and the phase shift of three or more different values occurs in the phase shifter.

Also, the non-interference component can be removed by a mathematical operation and the spectral phase change can be obtained from the two orthogonal components by measuring an interference fringe with which a non-interference component that is a background component overlapped with respect to the phase shift of the three or more different values. With the above method, the branching ratio and the combination ratio are both maintained at 50:50. It is unnecessary to introduce a stabilizing mechanism for suppressing a variation due to temperature. It is possible to miniaturize and simply manufacture the spectral shearing interferometer.

As described above, a procedure of a process of measuring the interference fringe with which the non-interference component is overlapped with respect to the phase shift whose values are the three different values and deriving the change in the spectral phase from two orthogonal components will be described hereinafter. Further, the non-interference component that is a background component can be removed and the spectral phase change can be obtained with high accuracy through the same procedure as a procedure of a process using a three-value phase shift that will be described hereinafter even when a phase shift whose values are four or more different values is used.

In the following description, the three different phase shift values are 0, π and α. Here, the phase shift value is shown in radians, and α is any value greater than 0 and less than π (0<α<π).

An interference power spectrum of the phase shift having the three different values described above is overlapped with the non-interference component that is a background component, and is represented as the following Equation (16) in a determinant. Equation (16) is an expression to replace Equation (11) representing an interference power spectrum of the interference component when the phase shift is 0 and π/2.

$$\begin{pmatrix} I_0(v) \\ I_\pi(v) \\ I_\alpha(v) \end{pmatrix} = \begin{pmatrix} I_{back}(v) + I_{int}(v)\cos[\Delta\phi(v)] \\ I_{back}(v) + I_{int}(v)\cos[\Delta\phi(v) + \pi] \\ I_{back}(v) + I_{int}(v)\cos[\Delta\phi(v) + \alpha] \end{pmatrix} \quad (16)$$

On the left side of Equation (16), the interference fringes with which the non-interference components in the phase shifts 0, π and α are overlapped in order are shown from top to bottom. Here, for example, the phase shifts are alternately switched in order of 0, π and α. Specifically, this is repeated using 0→π→α→0→π→α . . . and 0→π→α as one period.

Further, on the right side of Equation (16), a first item ($I_{back}(v)$) indicates a non-interference component that is each background component, and a second item ($I_{int}(v)\cos[\ldots]$) indicates an interference component. The non-interference component does not depend on the phase shift, but only on the frequency v of the light pulse.

The phase shifts (0, π, α) are contained in variable parts of the cos functions in the interference components of the phase shifts described above, respectively.

Further, the cos interference component (phase shift 0) and the interference component that is the background component are given as the following Equation (17) by the interference fringe with which the non-interference component in which the phase shifts of Equation (16) are 0 and π is overlapped.

$$\begin{pmatrix} I_{int}(v)\cos[\Delta\phi(v)] \\ I_{back}(v) \end{pmatrix} = \begin{pmatrix} \frac{I_0(v) - I_\pi(v)}{2} \\ \frac{I_0(v) + I_\pi(v)}{2} \end{pmatrix} \quad (17)$$

A process of obtaining a sin interference component (phase shift π/2) is performed according to the following procedure. First, the sin interference component is represented as the following Equation (18) using an addition theorem for a trigonometric function.

$$I_{int}(v)\sin[\Delta\phi(v)] = \frac{1}{\sin\alpha}[I_{int}(v)\cos[\Delta\phi(v)]\cos\alpha - I_{int}(v)\cos[\Delta\phi(v) + \alpha]] \quad (18)$$

The following Equation (19) is obtained by applying the expression in the second row of Equation (17) to the expression in the third row of the above Equation (16).

$$I_{int}(v)\cos[\Delta\phi(v) + \alpha] = I_\alpha(v) - I_{back}(v) \quad (19)$$

$$= I_\alpha(v) - \frac{I_0(v) + I_\pi(v)}{2}$$

Also, the cos component shown in the first rows of Equation (17) and Equation (19) are applied to Equation (18) to obtain the following Equation (20) representing the sin interference component.

$$I_{int}(v)\sin[\Delta\phi(v)] = \frac{1}{\sin\alpha}\left[\frac{I_0(v) - I_\pi(v)}{2}\cos\alpha - I_\alpha(v) + \frac{I_0(v) + I_\pi(v)}{2}\right] \quad (20)$$

Next, using the expression in the first row of Equation (17) and Equation (20), the change αφ(v) of the spectral phase and the power spectrum Iint(v) are obtained by the following Equations (21) and (22), respectively. Further, the power spectrum is equal to the square of the electric field intensity R of FIG. 1C.

$$\Delta\phi(v) = \tan^{-1}\left[\frac{\sin[\Delta\phi(v)]}{\cos[\Delta\phi(v)]}\right] \quad (21)$$

$$= \tan^{-1}\left[\frac{1}{\sin\alpha}\left\{\cos\alpha - \frac{2I_\alpha(v) - I_0(v) - I_\pi(v)}{I_0(v) - I_\pi(v)}\right\}\right]$$

$$I_{int}(v) = \sqrt{\left\{\frac{I_0(v) - I_\pi(v)}{2}\right\}^2 + \frac{1}{\sin^2\alpha}\left\{\frac{I_0(v) - I_\pi(v)}{2}\cos\alpha - I_\alpha(v) + \frac{I_0(v) + I_\pi(v)}{2}\right\}^2} \quad (22)$$

As described above, in the present invention, the spectral phase change can be obtained from the two orthogonal components from which the non-interference component has been removed, by measuring the interference fringe with which the non-interference component is overlapped with respect to the phase shift having the three different values.

Configuration and Functionality of Chromatic Dispersion Measurement Device

First Preferred Embodiment

Figure 2:
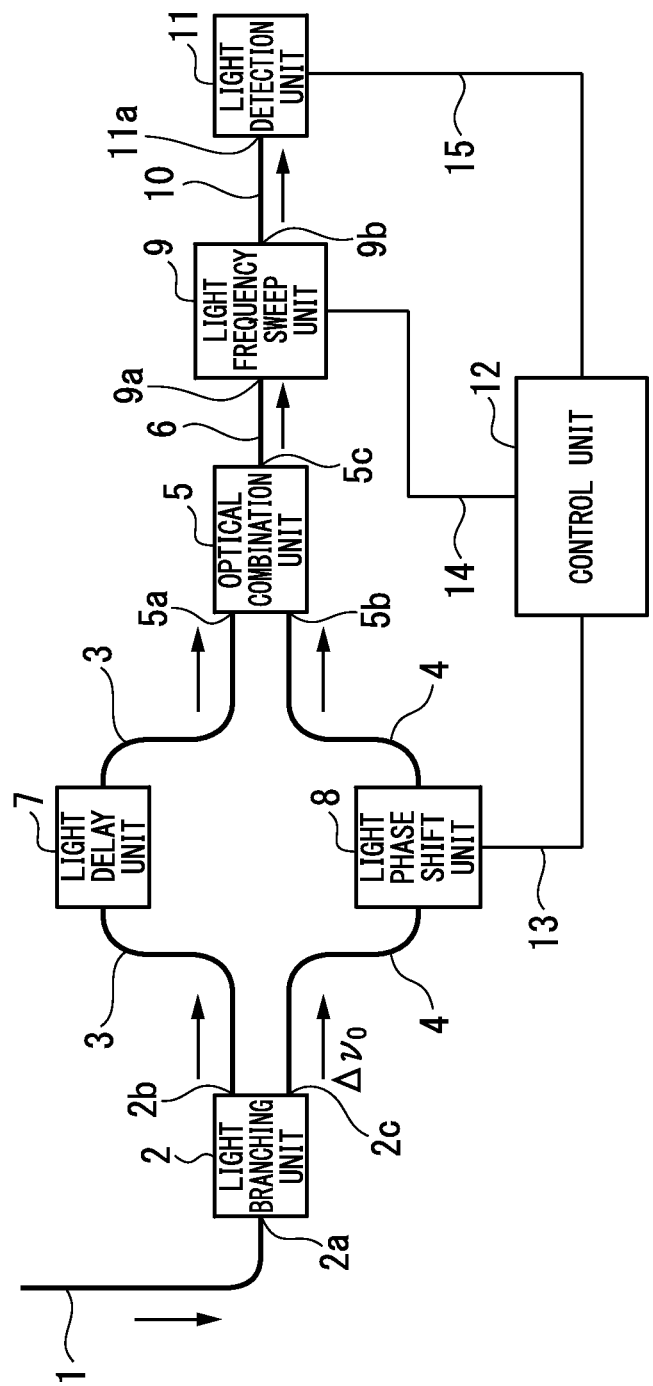
FIG. 2 is a block diagram showing a configuration example of a chromatic dispersion measurement device in accordance with a first preferred embodiment of the present invention.

Next, a configuration and functionality of a chromatic dispersion measurement device in accordance with the first preferred embodiment of the present invention will be described with reference to FIG. 2. FIG. 2 is a block diagram showing a configuration example of the chromatic dispersion measurement device in accordance with the first preferred embodiment of the present invention.

The chromatic dispersion measurement device includes an input optical fiber 1 as an incident path, a light branching unit 2, a first optical fiber 3 as a first light branching path, a second optical fiber 4 as a second light branching path, an optical combination unit 5, a combining optical fiber 6 as a combination path, a light delay unit 7, a light phase shift unit 8 as an optical phase shifter, a light frequency sweep unit 9, an output optical fiber 10 as an output light path, a light detection unit 11, a control unit 12, a phase control line 13, a frequency control line 14, and a detection control line 15. An optical path length of the first optical fiber 3 and the second optical fiber 4 is an interferometer length of a spectral shearing interferometer.

The input optical fiber 1 has one end to which a light pulse from an optical fiber transmission line or an optical part that is an evaluation target for which chromatic dispersion is evaluated is incident, and the other end connected to an input end (a first input end) 2a of the light branching unit 2. Here, a light pulse propagating through the optical fiber transmission line or the optical part, which is the evaluation target for which chromatic dispersion is evaluated is incident via the input optical fiber 1, and the incident light pulse is a measured light signal.

The light branching unit 2 branches the measured light signal input from the input end in two directions, guides the one light beam as the first measured light signal to the first optical fiber 3 having one end connected to one output end (a first output end) 2b of the light branching unit 2, and guides the other light beam as a second measured light signal to the second optical fiber 4 having one end connected to the other output end (a second output end) 2c of the light branching unit 2. Here, the first measured light signal has the time waveform shown in Equation (6) and the frequency spectrum shown in Equation (7). The second measured light signal has the time waveform shown in Equation (8) and the frequency spectrum shown in Equation (9).

Further, the light branching unit 2 generates a carrier frequency difference between the first measured light signal output from the one output end 2b to the first optical fiber 3 and the second measured light signal output from the other output end 2c to the second optical fiber 4.

In the present embodiment, as the carrier frequency difference is generated, for example, a frequency shift $\Delta v0$ is assigned as the carrier frequency difference to the second measured light signal output to the second optical fiber 4 so that the second measured light signal has a different frequency from the first measured light signal output to the first optical fiber 3. Meanwhile, there is no frequency change in the first measured light signal output to the first optical fiber 3.

For the light branching unit 2, for example, an acousto-optical frequency shifter is used. A 0-order light output port of the acousto-optical frequency shifter is connected to the one end of the first optical fiber 3 and a first-order light output port is connected to the one end of the second optical fiber 3. When a high frequency of a frequency $\Delta v0$ is supplied, the acousto-optical frequency shifter outputs the first measured light signal that is not frequency-shifted via the 0-order light output port, and outputs the second measured light signal that is frequency-shifted by a frequency $\Delta v0$ via the first-order light output port. The light branching unit 2 outputs the first measured light signal and the second measured light signal with the same polarization direction so that the optical combination unit 5, which will be described later, recombines the signals to acquire an interference component.

The optical combination unit 5 has one input end (a second input end) 5a connected to the other end of the first optical fiber 3, and the other input end (a third input end) 5b connected to the other end of the second optical fiber 4. Further, the optical combination unit 5 has an output end (a third output end) 5c connected to the combining optical fiber 6.

The optical combination unit 5 combines the first measured light signal incident from the one input end 5a and the second measured light signal input from the other input end 5b, and outputs the combined measured light signal from the output end 5c to the combining optical fiber 6.

Further, the light delay unit 7 is interposed on a path of the first optical fiber 3. The light delay unit 7 is provided in an optical fiber having a smaller optical path length than the other optical fiber with the purpose of equalizing an optical path length difference between the first optical fiber 3 and the second optical fiber 4, and assigns delay for removal of the optical path length difference to the measured light signal.

However, since fluctuation of the optical path length occurring between the first optical fiber 3 and the second optical fiber 4 can be reduced by providing the light delay unit 7 to remove the optical path length difference, it is possible to improve measurement precision for the change $\Delta\phi(v)$ in the spectral phase in Equation (14).

Further, if the optical path length difference between the first optical fiber 3 and the second optical fiber 4 does not have an influence on the measurement precision, it is unnecessary to provide the light delay unit 7.

Further, the light phase shift unit 8 is interposed on the path of the second optical fiber 4. The light phase shift unit 8 continuously phase-shifts the phase of the second measured light signal propagating through the second optical fiber 4 between 0 and $\pi$ (radians) in a first certain period. That is, the light phase shift unit 8 continuously changes a phase difference between the first measured light signal propagating through the first optical fiber 3 and the second measured light signal propagating through the second optical fiber 4 between 0 and $\pi$ in the first certain period. Here, the light phase shift unit 8 shifts the phase of the second measured light signal relative to the first measured light signal, but outputs the second shifted measured light signal with the same polarization direction as the first measured light signal.

Accordingly, a case in which the phase difference between the first measured light signal propagating through the first optical fiber 3 and the second measured light signal propagating through the second optical fiber 4 is 0 is called a 0 component detection mode, a case in which the phase difference is $\pi$ is called a $\pi$ component detection mode, and a case in which the phase difference is $\alpha$ is called a $\alpha$ component detection mode.

Respective expressions on the first, second and third rows in the matrix of Equation (16) correspond to interference fringes in which the non-interference component is overlapped with the interference component in the 0 component detection mode, the $\pi$ component detection mode, and the $\alpha$ component detection mode.

Here, as described above, the polarization directions of the first measured light signal and the second measured light signal output from the light branching unit 2 are the same, and polarization directions of the first measured light signal and the second measured light signal, a phase difference of which is phase-shifted between 0 and $\pi$ by the light phase shift unit 8, are also the same. Accordingly, any one of the 0 component detection mode in which the phase difference is 0, the $\pi$ component detection mode in which the phase difference is $\pi$ and the α component detection mode in which the phase difference is α can be selected by sequentially changing the phase difference occurring in the light phase shift unit 8 between 0 and π.

In the present embodiment, when the phase shift of the second measured light signal relative to the first measured light signal is 0, interference of the 0 component occurs in the first measured light signal and the second measured light signal. When the phase shift of the second measured light signal relative to the first measured light signal is π, interference of the π component occurs in the first measured light signal and the second measured light signal. When the phase shift of the second measured light signal relative to the first measured light signal is α, interference of the α component occurs in the first measured light signal and the second measured light signal.

The optical combination unit 5 outputs an interference component in the 0 component of the first measured light signal and the second measured light signal as the combined measured light signal when the phase shift of the second measured signal is 0, outputs an interference component in the π component of the first measured light signal and the second measured light signal as the combined measured light signal when the phase shift of the second measured signal is π, and outputs an interference component in the α component of the first measured light signal and the second measured light signal as the combined measured light signal when the phase shift of the second measured signal is α.

For the light phase shift unit 8, for example, a phase shifter using an electro-optic crystal (e.g., LiNbO$_3$) may be used, and the shift amount of the phase can be continuously changed between 0 and π by changing an applied phase shift voltage ($V_0$, $V_\pi$, and $V_\alpha$, which will be described later). In the present embodiment, the phase shift is continuously changed, but the present invention is not limited thereto and the chromatic dispersion measurement device in accordance with the present embodiment can be configured even when the phase shift is discretely changed (e.g., changed into three values, such as 0→α→π).

Further, while, in the present embodiment, the light delay unit 7 is connected to the first optical fiber 3 and the light phase shift unit 8 is connected to the second optical fiber 4, in fact, the light delay unit 7 is interposed in any one optical fiber having a short optical path length among the first optical fiber 3 and the second optical fiber 4, and the light phase shift unit 8 is connected to the other optical fiber.

As described above, it is possible to prevent remaining reflected light from reciprocating between the light delay unit 7 and the light phase shift unit 8 by inserting the light delay unit 7 and the light phase shift unit 8 into the optical paths of the different optical fibers, respectively. Thus, it is possible to remove a spectral ripple generated as the remaining reflected light reciprocates and resonates.

The light frequency sweep unit 9 has an input end (the fourth input end) 9a connected to the other end of the combining optical fiber 6, and an output end (a fourth output end) 9b connected to one end of the output optical fiber 10. The light frequency sweep unit 9 is, for example, a tunable band pass filter and performs sweep to change a frequency in a predetermined measurement frequency range in response to a trigger signal indicating start of a frequency sweep period (a period in which the frequency sweep is performed in the set measurement frequency range). The light frequency sweep unit 9 sequentially changes a center frequency of the band-pass frequency width within the above measurement frequency range. Further, the light frequency sweep unit 9 performs a process of extracting an interference element at a frequency corresponding to the above band-pass frequency width from the combined measured light signal incident from the combining optical fiber 6, that is, frequency decomposition for the combined measured light signal. The light frequency sweep unit 9 outputs a measured component light signal (a signal indicating a spectrum intensity of each frequency) after the frequency decomposition from the output end 9b to the output optical fiber 10. A frequency used for frequency decomposition of the combined measured light signal obtained by combining the first measured light signal and the second measured light is a center frequency in the above band-pass frequency width. In the above frequency decomposition, the interference elements of the 0 component, the π component and the α component (the interference component and the non-interference component overlapped with the interference component) of each frequency in the frequency decomposition (in the different frequency) are detected.

The light detection unit 11 has an input end (a fifth input end) 11a connected to the other end of the output optical fiber 10. Further, the light detection unit 11 converts the measured component light signal incident from the output optical fiber 10 into an electrical signal, and outputs the conversion result to the control unit 12 as an interference signal containing the non-interference component (with which the non-interference component is overlapped).

Here, the measured component light signal is an interference element of the 0 component of a corresponding frequency when the shift amount of the phase in the light phase shift unit 8 is 0, an interference element of the π component of the corresponding frequency when the shift amount of the phase in the light phase shift unit 8 is π, or an interference element of the α component of the corresponding frequency when the shift amount of the phase in the light phase shift unit 8 is α.

Further, in the present embodiment, a polarization maintaining fiber (PMF) having a polarization maintaining characteristic is used for each of the input optical fiber 1, the first optical fiber 3, and the second optical fiber 4. The polarization axes of the input optical fiber 1, the first optical fiber 3, and the second optical fiber 4 are all aligned in the same direction, the polarization directions of the first measured light signal and the second measured light signal are aligned to be the same, and the signals are incident on the optical combination unit 5. Accordingly, polarization of the measured light signal directly after propagating an optical fiber transmission line that is a target for which the chromatic dispersion is to be evaluated is converted into linear polarization using a polarization controller, which is not shown, the polarization axis is aligned with the polarization axis (e.g., a slow axis) of the input optical fiber 1, and then the measured light signal is incident on the input optical fiber 1. Further, the polarization maintaining fiber may also be used for the combining optical fiber 6 and the output optical fiber 10.

The control unit 12 is synchronized to a trigger signal indicating a start point of the frequency sweep period input from the light frequency sweep unit 9 via the frequency control line 14, and supplies the phase shift voltage to the light phase shift unit 8 via the phase control line 13 in order to continuously sequentially change the phase shift voltage applied to the light phase shift unit 8 in each of the first periods to perform the phase shift.

That is, since the 0 component, the π component, and the α component form one set for one frequency when the measurement frequencies are n points, a process of switching a shift amount of the phase shift by sequentially changing the phase shift voltage in the first period every first period obtained by dividing the frequency sweep period by the number n of measurement frequencies is performed in synchronization with the above trigger signal.

Further, the control unit 12 continuously sequentially receives the interference signals of the 0 component, the π component and the α component from the light detection unit 11 via the detection signal line 15 in synchronization with the first period. For example, in the present embodiment, the control unit 12 periodically receives the measurement frequencies in synchronization with the first period in order of 0 component→α component→π component in the first period in which one frequency is measured, multiplied by the number n of measurement frequencies. The phase shift voltage is continuously sequentially changed in order of 0 component→α component→π component in the first period, and the changing process is repeated every first period in a frequency sweep period.

Also, the control unit 12 sets the interference elements of the 0 component, the π component and the α component that are sequentially acquired, as one set, and uses the set as data of power spectrum for calculating the dispersion parameter in each frequency.

Next, the control unit 12 obtains Equation (16) to derive an interference power spectrum by the phase shift of three values of the interference signal of the 0 component, the interference signal of the π component and the interference signal of the α component from power spectra of levels of the interference signals with which the non-interference components of the 0 component, the π component and the α component are overlapped.

Further, the control unit 12 can obtain a power spectrum of a pair of cos and sin components every frequency using Equations (17), (19) and (20) obtained using Equation (16) and an addition theorem of a trigonometric function, and can obtain the change $\Delta\phi(\nu)$ of the phase every frequency using Equation (21). Also, the control unit 12 calculates a dispersion parameter for each frequency by applying the change $\Delta\phi(\nu)$ of the phase to Equation (5).

As described above, in the present embodiment, the start of the frequency sweep in the measurement frequency range is notified of by the trigger signal supplied from the light frequency sweep unit 9.

Further, the control unit 12 may set n times the first period as the frequency sweep period, generate a trigger signal indicating the start of the frequency sweep period, output the trigger signal to the light frequency sweep unit 9, and control the frequency sweep in the measurement frequency range.

Further, the start point and the end point need not be set to the same time and a time at which the frequency is returned to an initial value of the sweep may be provided between the start point and the end point by making the frequency sweep period discontinuous, providing a previously set certain time in the period and using a trigger signal of each of the start point and the end point of the frequency sweep period. Accordingly, since a change is performed from the start point to the initial value as in a case in which the end point and the start point are the same, the initial first period in the frequency sweep period is not shortened due to a frequency changing time, making high accuracy control of the measurement time possible.

Figure 3:
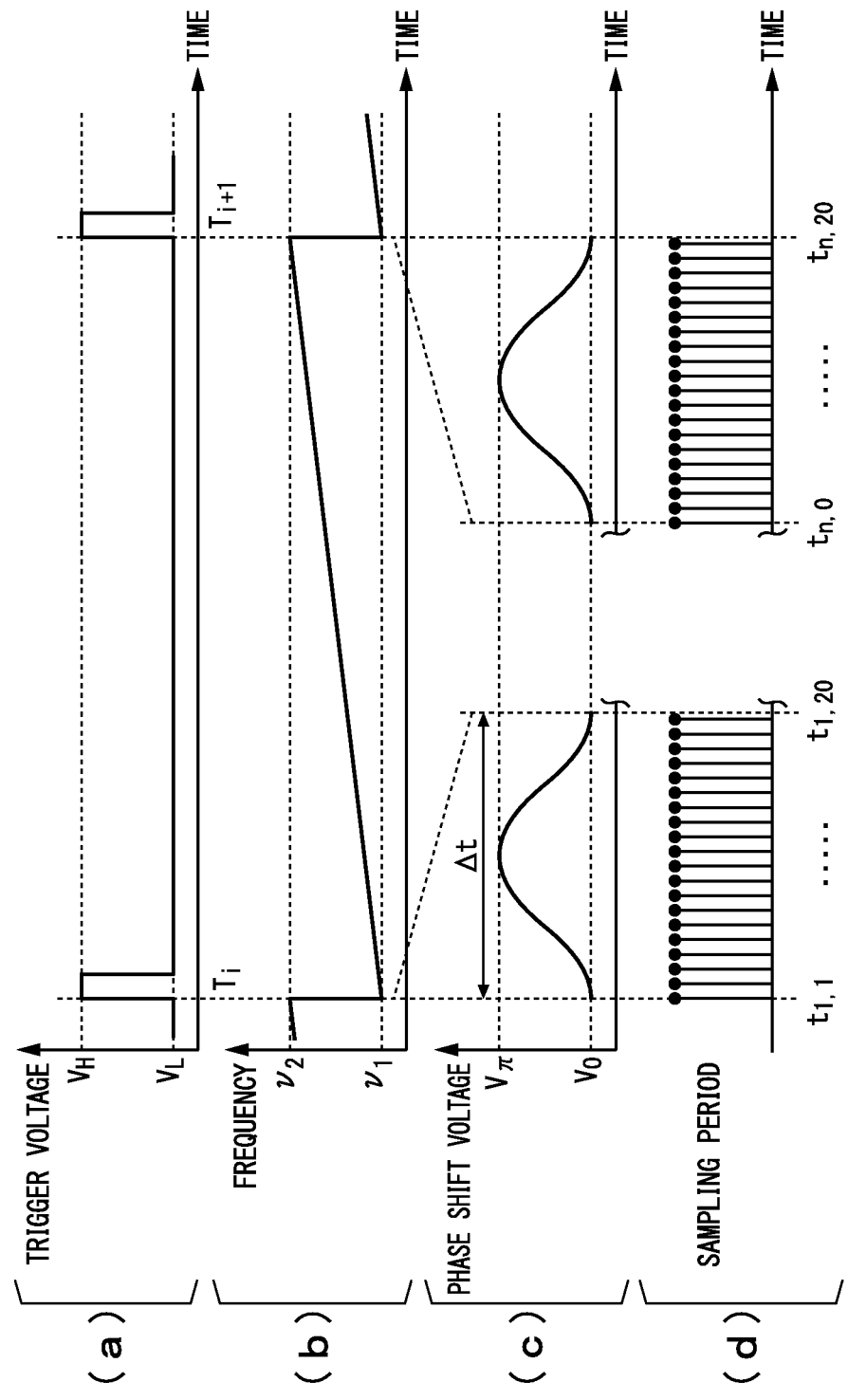
FIGS. 3(a) to 3(d) are waveform diagrams showing timings of a frequency sweep operation of a light frequency sweep unit 9, a phase shift operation of a light phase shift unit 8 corresponding to a frequency sweep operation, and an operation in sampling of an electrical signal from a light detection unit 11 in a control unit 12 in accordance with the first preferred embodiment of the present invention.

Next, an operation of measuring the measured light signal in the chromatic dispersion measurement device shown in FIG. 2 in the present embodiment will be described with reference to FIG. 3. FIG. 3 is a waveform diagram showing a timing of a frequency sweep operation of the light frequency sweep unit 9, a phase shift operation of the light phase shift unit 8 corresponding to the frequency sweep operation, and an operation in sampling of an interference signal from the light detection unit 11 in the control unit 12.

That is, FIG. 3(a) is a diagram showing an output timing of the trigger signal output by the light frequency sweep unit 9, in which a vertical axis indicates a voltage and a horizontal axis indicates time. In FIG. 3(a), each of an H level (VH) and an L level (VL) of the trigger signal output from the light frequency sweep unit 9 is set to be suitable for TTL control (control using TTL (Transistor-Transistor Logic) interference).

FIG. 3(b) shows a temporal change of a center frequency of a pass band output in the sweep of the light frequency sweep unit 9, in which a vertical axis indicates a frequency and a horizontal axis indicates time. In FIG. 3(b), $\nu_1$ denotes a sweep start frequency (the lowest frequency in a measurement frequency range), and $\nu_2$ denotes a sweep stop frequency (the highest frequency in the measurement frequency range). Accordingly, the frequency $\nu_1$ to the frequency $\nu_2$ is the measurement frequency range, that is, a frequency sweep range.

FIG. 3(c) is a diagram showing a waveform of a phase shift voltage for changing a phase difference in the first period $\Delta t$, which is applied to the light phase shift unit 8, in which a vertical axis indicates a voltage and a horizontal axis indicates time. A phase shift voltage $V_0$ is a voltage when the phase difference is 0 (0 component detection mode), and a phase shift voltage $V_\pi$ is a voltage when the phase difference is π (π component detection mode). Further, if the voltage when the shift amount of the phase shift is α (α component detection mode) is $V_\alpha$, $V_\alpha$ in the present embodiment is greater than $V_0$ and smaller than $V_\pi$, that is, $V_0 < V_\alpha < V_\pi$. The control unit 12 periodically changes the phase shift voltage in a sinusoidal shape in the first period $\Delta t$, and applies the resultant phase shift voltage to the light phase shift unit 8.

FIG. 3(d) is a diagram showing a timing of a sampling period in which the control unit 12 receives, as time-series data, an interference signal with which the non-interference signal from the light detection unit 11 is overlapped, in which a vertical axis indicates a voltage and a horizontal axis indicates time.

In order to clearly describe the first period, a time scale of a width in FIGS. 3(a) and 3(b) is enlarged and only a partial time range is shown in FIGS. 3(c) and 3(d).

The light frequency sweep unit 9 outputs the trigger signal to the control unit 12 in the frequency sweep period of a time "$T_{l+1} - T_l$" in which the trigger signal is generated, and starts a sweep process to linearly increase the frequency from the frequency $\nu_1$ to the frequency $\nu_2$ in order to perform frequency decomposition of the combined measured light signal. Here, a sweep change is measured before the user actually performs measurement. When linearity of the frequency swept relative to time is detected not to be accomplished, calibration of the sweep frequency is performed to correct the non-linearity of the frequency sweep. While, in the present embodiment, the frequency sweep from a low frequency to a high frequency is performed, the frequency sweep from the high frequency to the low frequency may be performed. Further, the timing control is not limited to the TTL control and, for example, a CMOS (Metal Oxide Semiconductor) interface also be used.

When the trigger signal is supplied, the control unit 12 starts a process of continuously sequentially outputting a phase shift voltage from a voltage $V_0$ to a voltage $V_\pi$ to the light phase shift unit 8 in each of the first periods $\Delta t$ in synchronization with the trigger signal. While, in the present embodiment, the supply from the phase shift voltage $V_0$ is performed, the supply from the phase shift voltage $V_\pi$ to the phase shift voltage $V_0$ may be performed.

As a result, the light phase shift unit 8 continuously sequentially changes the phase of the second measured light signal propagating through the second optical fiber 4 in a range from 0 to $\pi$ using the change from the supplied phase shift voltage $V_0$ to the phase shift voltage $V_\pi$.

The light detection unit 11 continuously supplies, to the control unit 12, a measured component light signal having an interference element in which a shift amount of the phase shift at each measurement frequency corresponds to each of 0, $\pi$ and $\alpha$ according to the phase shift changing from 0 to $\pi$ in each of the first periods $\Delta t$, i.e., at each measurement frequency, as an interference signal.

Also, the control unit 12 can obtain each of a component ratio measurement light signal having an interference element of the 0 component, a measured component light signal having an interference element of the $\pi$ component, and a measured component light signal having an interference element of the $\pi$ component in each measurement frequency in this order by sampling the above measured component light signal in a certain sampling interval in the first period $\Delta t$ in synchronization with the first period $\Delta t$. Here, the control unit 12 sequentially changes the phase shift voltage in the certain sampling interval described above, samples the measured component light signal in synchronization with a timing at which each of the phase shift voltages $V_0$, $V_\alpha$ and $V_\pi$ has been output, and obtains the resultant signal as the interference element of the 0 component, the interference element of the $\alpha$ component, and the interference element of the $\pi$ component.

That is, the control unit 12 can obtain the interference elements of a set of 0, $\alpha$ and $\pi$ components corresponding to one measurement period in this order when continuously changing the phase amount of the phase shift of the second measured signal as $0 \rightarrow \pi \rightarrow 0$ in the first period. Accordingly, interference elements of n sets of 0, $\alpha$ and $\pi$ components in the measurement frequency range are obtained from a number n of the first periods $\Delta t$.

Further, in order to improve determination precision in which the shift amounts of the phase shift are 0, $\alpha$ and $\pi$, the control unit 12 performs 20-point sampling while the phase shift voltage is being changed as $0 \rightarrow \pi \rightarrow 0$ in the first period. That is, in the present embodiment, the control unit 12 acquires interference fringe data of 20 components having a different shift amount, which correspond to 20 measured component light signals, in the first period.

Also, when the control unit 12 obtains the change $\Delta\phi(v)$ of the spectral phase and the power spectrum $I_{int}(v)$, the control unit 12 extracts three types corresponding to 0, $\pi$ and $\alpha$ components from the interference fringe data of the 20 components from a plurality of sampled interference fringe data, based on timings at which the respective phase shift voltages $V_0$, $V_\alpha$ and $V_\pi$ are output, and applies the types to Equations (21) and (22). Here, when the measurement frequencies are n points, the total sampling number is 20n (optical components) by sweeping the frequency once in the frequency sweep period.

As described above, the control unit 12 samples and measures the interference elements of the 0, $\alpha$ and $\pi$ components in the sampling period of a certain time interval. Accordingly, one system of a reception port for receiving a clock signal (an electrical signal) used for sampling and the component ratio measurement light signal may be provided in the control unit 12, making it possible to simplify a configuration of the chromatic dispersion measurement device.

In FIG. 3(d), measurement points of the first measurement frequency when sampling is performed 20 times in each of first periods of n measurement frequencies, i.e., sampling timings $t_{1,1}$ to $t_{1,20}$, and the measurement points of the $n^{th}$ measurement frequency, i.e., sampling timings $t_{n,1}$ to $t_{n,20}$, are shown.

Here, when the number of measurement points at which sampling is performed is 20 in each of the first periods, a change in the sweep frequency of each measurement point cannot be neglected. Accordingly, it is necessary to correct a change in a sweep frequency of each measurement point in each of the first periods and maintain frequency precision of each obtained interference fringe data. In the present embodiment, a configuration for performing linear interpolation, in the same order, using n measurement values at the sampling timings that are the measurement frequencies in the same order in the first periods among 20n measurement values in the frequency sweep period to calculate the interference fringe data of the 20 components at each sampling timing is provided in the control unit 12. Accordingly, the control unit 12 includes a memory for storing a program for performing the linear interpolation described above or a circuit for executing the linear interpolation.

Accordingly, an interpolation process in which a measurement interval for each frequency component is 1/20 is performed on each phase component, and the number of data points of an interference signal of each phase component is 20 times, any data can be selected from interference fringe data of the optical components that are multiplied by 20 and used for the evaluation of the chromatic dispersion. Since the frequency sweep is linearly performed, the phase amount corresponding to the measurement frequency can be determined by a linear relationship over time. As a result, the interference fringe data corresponding to each phase component can be easily interpolated.

Further, although not shown in FIG. 2, the chromatic dispersion measurement device of the present embodiment includes a storage unit for storing 20n measured interference fringe data used to perform the linear interpolation. The control unit 12 sequentially writes and stores the 20n measured interference fringe data together with identification information (e.g., a sampling timing $t_{i,j}$ indicating the j-th measurement point at the i-th first frequency described above) in the storage unit, and reads each interference fringe data to perform linear interpolation at a time when the frequency sweep period ends. Here, i is an integer equal to or greater than 1 and equal to or less than n ($1 \leq i \leq n$), and j is an integer equal to or greater than 1 and equal to or less than 20 ($1 \leq j \leq 20$).

In FIG. 3(d), the 0 component when a shift amount of the phase shift is 0, the $\alpha$ component when the shift amount is $\alpha$, and the $\pi$ component when the shift amount is $\pi$ correspond to interference fringe data measured at the sampling timings $t_{i,1}$, $t_{i,6}$, and $t_{i,11}$, respectively. Here, the control unit 12 performs phase calibration of the phase amount of the $\alpha$ component used to calculate the change $\Delta\phi(v)$ of the spectral phase.

For example, in the present embodiment, the phase calibration of the phase amount corresponding to the sampling time $t_{i,6}$ is performed and the phase amount at the sampling time $t_{i,6}$ is $0.418436\pi$ in radian.

A method of phase calibration of the $\alpha$ component performed herein is performed in the following procedure.

The phase is changed linearly relative to the sampling timing. Accordingly, when the value of the interference fringe data of the sampling timing $t_{i,1}$ is a value of the 0 phase component and the value of the interference fringe data of the sampling timing $t_{i,11}$ is a value of the $\pi$ phase component, a corresponding trigonometric function is uniquely determined as a function of the sampling timing. Based on an inverse function of the trigonometric function, the phase value corresponding to the value of the interference fringe data is obtained at the sampling timing $t_{i,5}$. The phase value obtained from the inverse function of the trigonometric function becomes the calibration value of the phase value of the α component. As the above j increases, the resolution of the phase value by the sampling timing is improved. Accordingly, the above maximum and minimum values are close to true maximum and minimum values and the precision of determination of the phase of the α component increases.

Further, when the number of sampling points is small (less than 20 in the present embodiment), precision of interpolation of the interference fringe data described above is degraded, the determination precision of 0, α and π that are shift amounts of the phase shift is degraded, and a ripple is generated in the change $\Delta\phi(v)$ of the spectral phase or the calculation result of the power spectrum $I_{int}(v)$ (a graph of each power spectrum $I_{int}(v)$, in which a horizontal axis indicates the frequency and a vertical axis indicates the change $\Delta\phi(v)$).

Further, if the phase amount obtained by the phase calibration is α, even when the number of calculation digits after a decimal point is small (when the precision of the phase calibration is low), a ripple is generated in the change $\Delta\phi(v)$ of the spectral phase or the calculation result of the power spectrum $I_{int}(v)$.

In the present embodiment, the relative intensity of the ripple is calculated, as the number of sampling points (20 points in the first period) and the number of digits (6 digits) after the decimal point of a calibrated phase amount at the sampling time $t_{i,6}$, to be less than 1 ppm of an actually measured value of each of the change $\Delta\phi(v)$ of the spectral phase and the power spectrum $I_{int}(v)$.

Further, if there is frequency dependence in the phase shift occurring in the light phase shift unit 8, when the frequency is swept, the phase shift is changed according to the frequency and the determination precision of the phase shift is degraded.

However, if the relative intensity of the ripple in the change $\Delta\phi(v)$ of the spectral phase or the power spectrum $I_{int}(v)$ is less than 1 ppm at any frequency in the sweep frequency, the relative intensity of the ripple is expected to be less than 1 ppm at the other frequencies and evaluation of the chromatic dispersion can be performed with high measurement precision.

While, in the present embodiment, the number of the interference components, that is, the number of sampling points in the first period, is 20 and the number of calculation digits of the phase amount α is 6 digits after a decimal point, the present invention is not limited to the number of sampling points and the number of digits after the decimal point, and a determination is made as to whether the relative intensity of the ripple is reduced and to what extent based on whether the required relative intensity of the ripple is allowed and to what extent to set the number of sampling points and the number of digits after the decimal point. Further, it is understood that the number of digits after the decimal point of the number of calculation digits of the phase amount π should be determined and set according to the reduction of the relative intensity of the ripple, similar to the phase amount α.

Further, in the present embodiment, the measured component light signal measured at the sampling time $t_{i,6}$ is used as the interference fringe data of the phase amount α described above, but the present invention is not limited to this sampling time and any one of the 20 sampling time that has been measured may be used as long as the phase shift has a phase amount other than the phase amounts 0 and π. Here, usually, if the phase amount of the phase shift is not an adjacent value, an error of the phase amount is reduced. An influence on the relative intensity of the ripple is small.

Accordingly, in each of the sampling times the relative intensity of the ripple may be observed and a determination may be made as to whether the sampling time at which the relative intensity of the ripple is in a required allowable range is to be used for sampling of the phase amount α.

Further, an application to image processing using a phase shift interferometer to measure interference components in which the phase amounts of the phase shift are different multiple times and improve precision of phase difference determination is disclosed in "Applied Optics Vol. 39, No. 4, pp. 585-591, Feb. 1, 2000, 'Phase-shifting interfermetry with uncalibrated hase shifts,' Xin Chen, Maureen Gramaglia, and John A. Yeazell."

For example, when the number n of the first periods is 1000 and the frequency sweep period $T_{i+1}-T_i$ is 1 s (second), the first period $\Delta t$ that is the switching period of the phase shift voltage is 1 ms, which is obtained by dividing 1 second by n, i.e., 1000. Further, when the time 1 ms of the first period is divided by the number 20 of measurement points (sampling points) in the first period, the interval of the sampling timing is 50 μs. As described above, the total number of interference fringe data of the component of each phase amount of the phase shift is 20000, which is obtained by multiplying n by 20, through linear interpolation.

Further, the measured light signal conforms to an ITU (International Telecommunication Union) grid at a 100 GHz interval, and the frequency sweep range $v_2-v_1$ is 100 GHz. For example, when the measured light signal is allocated to a $31^{st}$ channel of a C band of the ITU grid, the frequency $v_1$ and the frequency $v_2$ are 193.05 THz and 193.15 THz, respectively. In this case, if the sampling interval is converted into a frequency interval, the sampling interval is 50 MHz.

In order to improve the measurement precision for the change $\Delta\phi(v)$ of the spectral phase, it is necessary to obtain an accurate phase at each sampling point. Accordingly, it is preferable for the band-pass frequency width in the light frequency sweep unit 9 to be as narrow as half of the sampling interval or less.

As the band-pass frequency width is narrower, resolution of the frequency decomposition can be increased and the change $\Delta\phi(v)$ of the spectral phase with respect to the frequency can be measured with high accuracy.

However, when the band-pass frequency width is narrow, an amount of light incident on the light detection unit 11 is reduced and an influence of the measurement noise may increase.

In the present embodiment, the band-pass frequency width is ½ of the sampling frequency (a sampling interval), that is, 25 MHz. In this case, finesse of the band-pass optical filter used in the light frequency sweep unit 9 is a value obtained by dividing a peak interval by the whole width of a half of a transmission peak, that is, 4000.

When phase fluctuation is measured using a heterodyne spectrum interferometer and if an optical fiber length used in the path of the interferometer is about 1 m, a time constant needed for a phase of about 180 is about 5 s. Accordingly, when the frequency sweep period is set to 1 s, an influence of the phase fluctuation of the interferometer is expected to be less.

When it is necessary to further reduce the phase fluctuation in order to improve the measurement precision, the frequency sweep period may be further shortened. For example, the influence of the phase fluctuation in the frequency dispersion can be neglected by shortening the frequency sweep period to about 0.1 s.

While, in the present embodiment, the light frequency sweep unit 9 linearly sweeps the frequency as described above, the sweep may stop in a period in which sampling of a set of 0, α and π components is performed and the frequency sweep may be performed in a step shape so that the measurement frequency is the same frequency in the period in which the sampling of the set of 0, α and π components is performed.

With the configuration, there is no frequency change and it is unnecessary to perform the linear interpolation, which has already been described, between the set of 0, α and π components. Thus, it is unnecessary to spatially arrange a linear interpolation configuration and it is possible to further simplify the structure of the chromatic dispersion measurement device and miniaturize the device.

Further, in the present embodiment, the interferometer is calibrated without using the space optical system unlike a conventional example. Accordingly, light loss does not occur in input and output of the light between the optical fiber and the space optical system and degradation of intensity of the light is suppressed. It is possible to measure the chromatic dispersion with the maintained measurement sensitivity of the interference component.

Furthermore, while, in the present embodiment, the range of the phase amount change in the phase shift is from 0 to π as described above, the phase amount may be changed from 0 to π or more or 2π or less. In particular, as the phase amount in the phase shift is changed in a range of 0 to 2π, the frequency dependence of the phase amount of the phase shift in the phase shifter 8 can be over an overall area of the sweep frequency, thus making it possible to improve phase determination precision in the overall area of the sweep frequency.

However, in this case, it is necessary to increase the determination precision of the phase amount of the phase shift by increasing the number of sampling points in the first period, for example, from 20 to 40.

Second Preferred Embodiment

Next, a chromatic dispersion measurement device in accordance with a second preferred embodiment will be described. The second preferred embodiment has the same configuration as the first preferred embodiment, but a set of a 0 component, an α component and a π component are received in parallel via three reception ports (reception ports P1, P2 and P3, which will be described later) provided in parallel with the control unit 12 in the configuration of FIG. 2.

Figure 4:
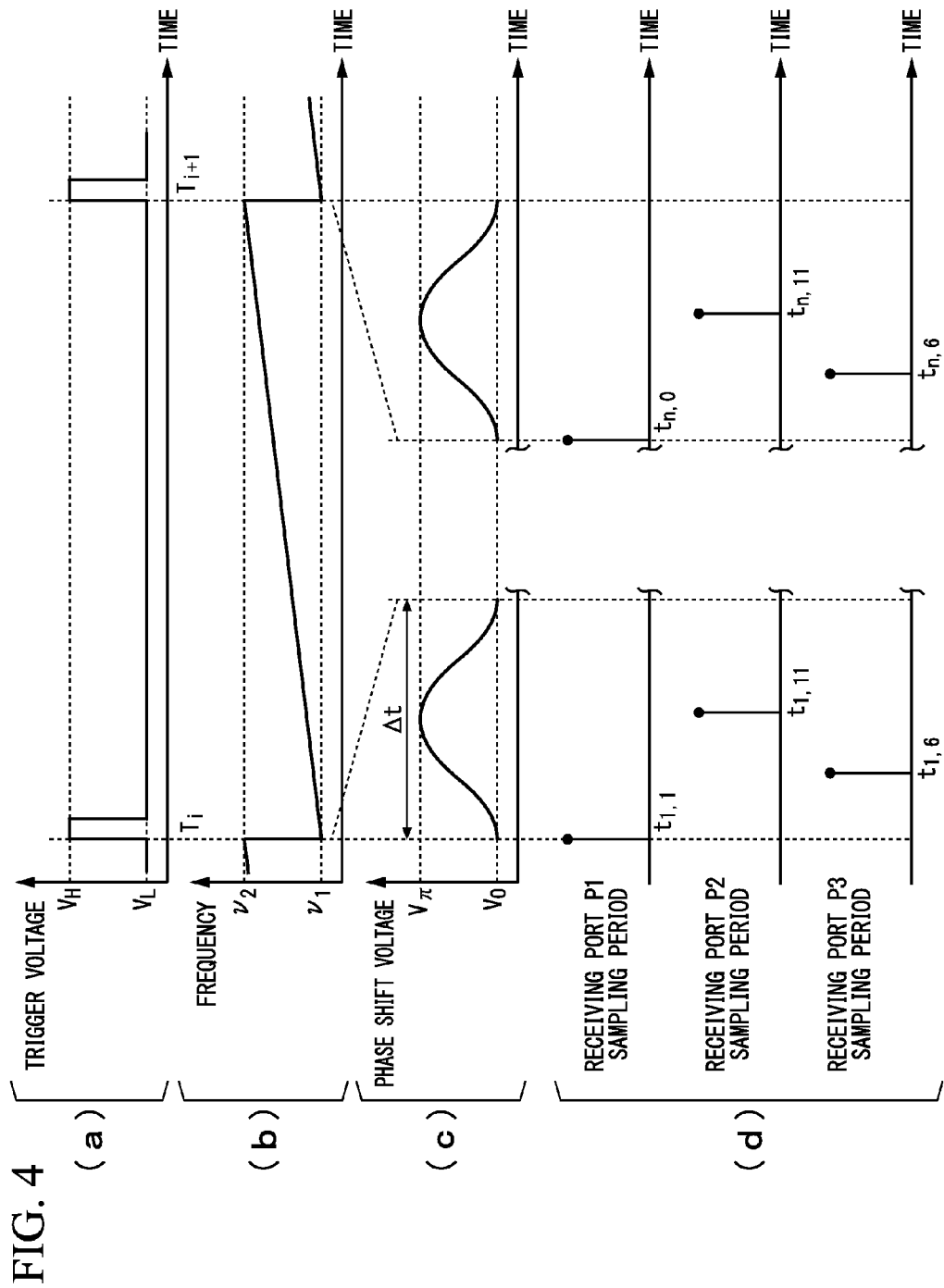
FIGS. 4(a) to 4(d) are waveform diagrams showing timings of a frequency sweep operation of a light frequency sweep unit 9, a phase shift operation of a light phase shift unit 8 corresponding to a frequency sweep operation, and an operation in sampling of an electrical signal from a light detection unit 11 in a control unit 12 in accordance with a second preferred embodiment of the present invention.

FIG. 4 is a waveform diagram showing timings of a frequency sweep operation of the light frequency sweep unit 9, a phase shift operation of the light phase shift unit 8 corresponding to the frequency sweep operation, and an operation in sampling of an interference signal from the light detection unit 11 in the control unit 12.

FIG. 4(a) is a diagram showing an output timing of the trigger signal output by the light frequency sweep unit 9, in which a vertical axis indicates a voltage and a horizontal axis indicates time. In FIG. 4(a), each of an H level and an L level of the trigger signal output from the light frequency sweep unit 9 is set to be suitable for TTL control.

FIG. 4(b) shows a temporal change of a resonant frequency output in the sweep of the light frequency sweep unit 9, in which a vertical axis indicates the frequency and a horizontal axis indicates time. In FIG. 4(b), $v_1$ denotes a sweep start frequency (the lowest frequency in the measurement frequency range), and $v_2$ denotes a sweep stop frequency (the highest frequency in the measurement frequency range).

FIG. 4(c) is a diagram showing a waveform of a phase shift voltage for changing a phase difference in a first period, which is applied to the light phase shift unit 8, in which a vertical axis indicates the voltage and a horizontal axis indicates time. A phase shift voltage $V_0$ is a voltage when the phase difference is 0 (a 0 component detection mode), a phase shift voltage $V_\pi$ is a voltage when the phase difference is π (a π component detection mode), and a phase shift voltage $V_\alpha$ is a voltage when the phase difference is α (an α component detection mode). Further, the phase shift voltage used to detect the 0 component, the α component and the π component is sinusoidally changed in the first period. Here, α is a phase amount in radians and is a real number for which 0<α<π. Thus, α is changed in a range of 0<α<π.

FIG. 4(d) is a diagram showing a timing of a sampling period in which the control unit 12 receives an interference signal from the light detection unit 11, as time-series data, in parallel from a reception port P1, a reception port P2, and a reception port P3, in which a vertical axis indicates a voltage and a horizontal axis indicates time. In the present embodiment, the reception port P1 receives the measured component light signal of the 0 component, the reception port P2 receives the measured component light signal of the π component, and the reception port P3 receives the measured component light signal of the α component.

In order to clearly describe the first period, a time scale of a width in FIGS. 4(a) and 4(b) is enlarged and only a partial time range is shown in FIGS. 4(c) and 4(d).

When the control unit 12 is outputting the phase shift voltage $V_0$, the control unit 12 receives the measured component light signal from the light detection unit 11 via the reception port P1. When the control unit 12 is outputting the phase shift voltage $V_\pi$, the control unit 12 receives the measured component light signal from the light detection unit 11 via the reception port P2. When the control unit 12 is outputting the phase shift voltage $V_\alpha$, the control unit 12 receives the measured component light signal from the light detection unit 11 via the reception port P3.

Even in the second preferred embodiment, the number n of the first periods in the frequency sweep period is 1000 and the frequency sweep period is 1 s, as in the first preferred embodiment. The sampling period of each of the reception port P1, the reception port P2 and the reception port P3 is 1 ms.

In the control unit 12, A/D (analog/digital) conversion is performed to acquire a voltage level of the interference signal from the light detection unit 11 as digital data (interference fringe data).

Accordingly, an operation speed of an A/D conversion circuit in the control unit 12 is likely to be a limiting factor when a sampling period is desired to be shortened. However, in the present embodiment, a sampling rate of each reception port is ⅓ of a sampling rate in the case of the reception using only one port by adopting parallel reception of three systems of the reception port P1, the reception port P2 and the reception port P3, making it possible to increase the limit of an operation speed of the A/D conversion circuit three times.

Further, since it is unnecessary to allocate, in order, respective measurement timings of the 0 component, the α component and the π component in one reception port, the data processing program is simplified and the data process speed can be improved.

Third Preferred Embodiment

Figure 5:
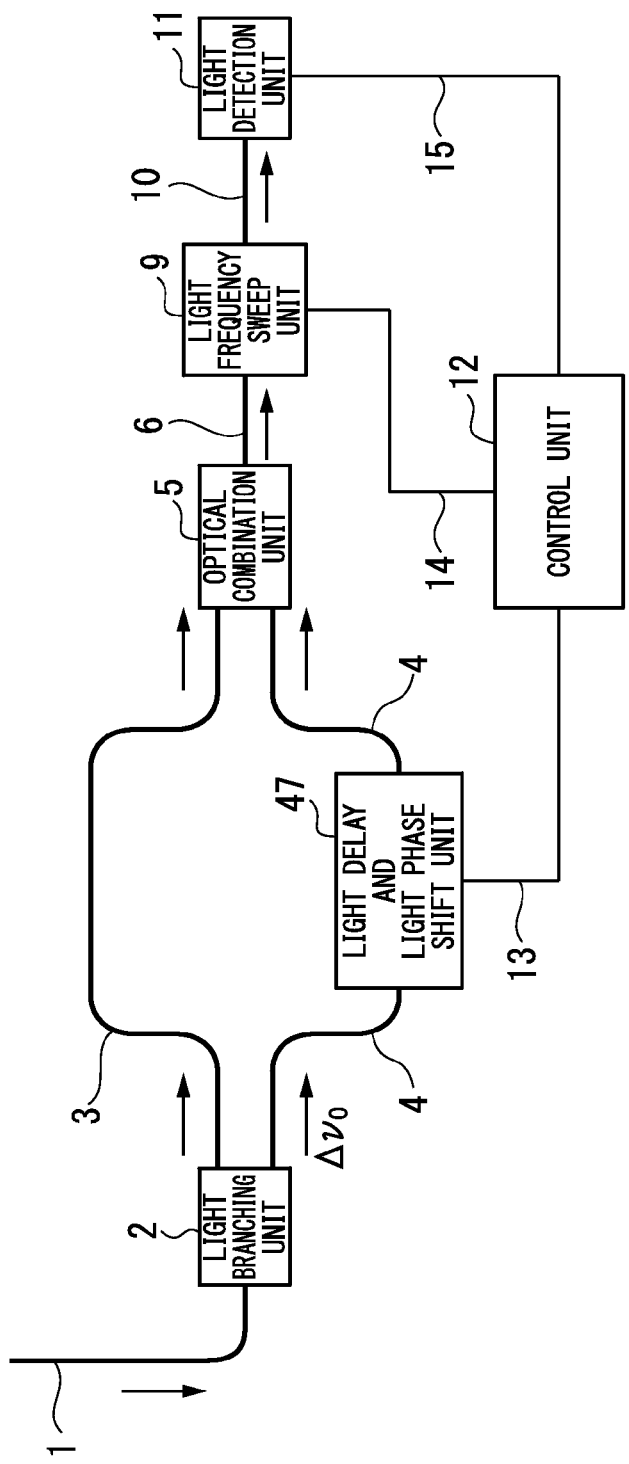
FIG. 5 is a block diagram showing a configuration example of a chromatic dispersion measurement device in accordance with a fourth preferred embodiment of the present invention.

Next, a chromatic dispersion measurement device in accordance with a third preferred embodiment of the present invention will be described. FIG. 5 is a block diagram showing a configuration example in accordance with the third preferred embodiment of the present invention. The same reference numerals are assigned to the same configurations as those in the first preferred embodiment, and different configurations from those in the first preferred embodiment will be described hereinafter.

When the light delay unit 7 that removes an optical path length difference between the first optical fiber 3 and the second optical fiber 4 and the light phase shift unit 8 that shifts a phase of the measured light signal are used, the light delay unit 7 and the light phase shift unit 8 are connected to different optical fibers, respectively, in the case of the first preferred embodiment.

In order to make it unnecessary to provide the light delay unit 7 and the light phase shift unit 8 in the different optical fibers as in the configuration of the first preferred embodiment shown in FIG. 2, in the third preferred embodiment, a light delay and light phase shift unit 47 having the light propagation delaying functionality of the light delay unit 7 and the light phase difference shifting functionality of the light phase shift unit 8 by integrating the light delay unit 7 and the light phase shift unit 8 is provided in any one of the first optical fiber 3 and the second optical fiber 4. When any one of the first optical fiber 3 and the second optical fiber 4 has a smaller optical path length than the other optical fiber, the light delay and light phase shift unit 47 is provided in the one optical fiber to correct an optical path length difference relative to the other optical fiber.

Accordingly, it is possible to further miniaturize the device in comparison with the first preferred embodiment, by using the light delay and light phase shift unit 47 obtained by integrating the light delay unit 7 and the light phase shift unit 8.

Further, the integration of the light delay unit 7 and the light phase shift unit 8 makes it possible to reduce the remaining reflected light generated in the optical fiber in comparison with a case in which the light delay unit 7 and the light phase shift unit 8 are separately provided in the same optical fiber. Accordingly, it is possible to suppress spectral ripple due to the resonance of the remaining reflected light shown in the first preferred embodiment to be at a lower level.

Fourth Preferred Embodiment

Figure 6:
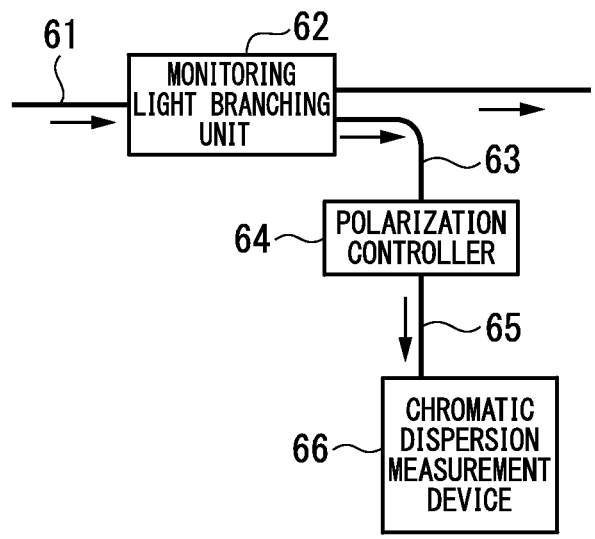
FIG. 6 is a diagram illustrating a measurement method of measuring a dispersion parameter of a light pulse propagating through an optical fiber transmission line by using the chromatic dispersion measurement device in accordance with the present invention.

Next, a chromatic dispersion measurement device in accordance with a fourth preferred embodiment of the present invention will be described. FIG. 6 is a diagram illustrating a measurement method of measuring a dispersion parameter of a light pulse propagating through an optical fiber transmission line using the chromatic dispersion measurement device in accordance with any one of the first to third preferred embodiments of the present invention. In FIG. 6, the chromatic dispersion measurement device 66 is the chromatic dispersion measurement device in accordance with any one of the first to third preferred embodiments.

A monitoring light branching unit 62 is arranged in a chromatic dispersion evaluation position on a path of an optical fiber transmission line 61. The monitoring light branching unit 62 extracts a light pulse propagating through the optical fiber transmission line 61 as a measured signal and outputs the measured signal to the polarization controller 64 via the monitoring optical fiber 63.

In this case, the monitoring light branching unit 62 extracts a part of power of the light pulse propagating through the optical fiber transmission line 61 not to be attenuated to an extent to which the propagation in the optical fiber transmission line 61 is affected. In the present embodiment, the monitoring light branching unit 62 braches the part of the power of the light pulse propagating through the optical fiber transmission line 61, for example, 10%, as a measured light signal, to a monitoring optical fiber 63. That is, a power branching ratio of the light pulse propagating through the optical fiber transmission line 61 and the measured light signal propagating through the monitoring optical fiber 63 becomes 9:1 due to the branch in the monitoring light branching unit 62. For the monitoring optical fiber 63, for example, a standard dispersion, single-mode optical fiber is used.

The polarization controller 64 converts a polarization state of the measured light signal into linear polarization, aligns the polarization axis with a polarization axis (e.g., a slow axis) of an input optical fiber 65 (the input optical fiber 1 in FIG. 2 or 5), and then outputs the measured light signal to the input optical fiber 65.

For the input optical fiber 65, a polarization maintaining fiber is used. The input optical fiber 65 aligns the polarization axis with a polarization axis of the polarization maintaining fiber (the first optical fiber 3 and the second optical fiber 4) in the chromatic dispersion measurement device 66.

Accordingly, in the present embodiment, when the chromatic dispersion in the optical fiber transmission line 61 is measured, the measurement of the chromatic dispersion is performed using a light pulse actually propagating through the optical fiber transmission line 61. Accordingly, it is unnecessary to prepare a dedicated light source, input a light pulse for measurement from the light source via the input end of the optical fiber transmission line 61, extract a light pulse for measurement output from the output end of the optical fiber transmission line 61, and extract the light pulse for measurement to perform the measurement of the chromatic dispersion, unlike a conventional example.

It is possible to perform the measurement of the chromatic dispersion in the whole of the optical fiber transmission line 61, as well as the measurement of chromatic dispersion of a distance to any position of the optical fiber transmission line 61 at the position, thus improving a degree of freedom of the measurement position of the chromatic dispersion.

Further, since the space optical system is not used, the device can be miniaturized. The device is carried, plays an information transmission role in any position of any optical fiber transmission line, and measures the change $\Delta\phi(v)$ of the spectral phase with respect to a small frequency shift without specifically needing a light source for measurement to monitor this light pulse, using the propagating light pulse, making it possible to evaluate the chromatic dispersion of the optical fiber transmission line 61.

Fifth Preferred Embodiment

Figure 7:
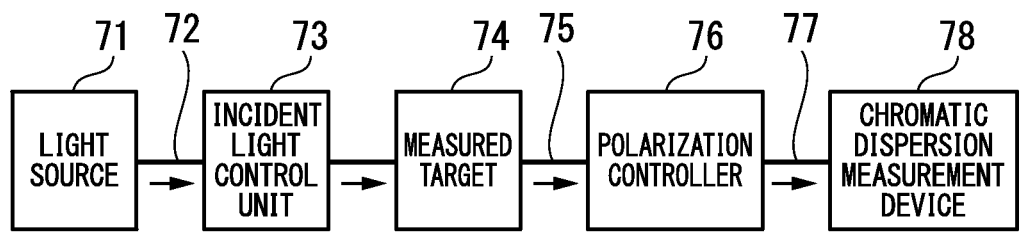
FIG. 7 is a diagram illustrating a measurement method of measuring a dispersion parameter of a light pulse propagating through an optical part by using the chromatic dispersion measurement device in accordance with the present invention.

Next, a chromatic dispersion measurement device in accordance with a fifth preferred embodiment of the present invention will be described. FIG. 7 is a diagram illustrating a measurement method of measuring a dispersion parameter of a light pulse propagating through an optical part using the chromatic dispersion measurement device in accordance with any one of the first to third preferred embodiments of the present invention. In FIG. 7, a chromatic dispersion measurement device 78 is the chromatic dispersion measurement device in accordance with any one of the first to third preferred embodiments.

In the present embodiment, when the chromatic dispersion of an optical part that is a measured target is measured, no particular light source for measurement is prepared, and an optical transmitter that outputs a light pulse, which is usually transmitted for information delivery, to an optical fiber transmission line is used as a light source 71. Thus, the light source 71 is a light source used for the optical fiber transmission line and, in the present embodiment, an optical transceiver for converting an interference signal into a light pulse is used. The light source 71 outputs the light pulse as a measured light signal to an input optical fiber 72.

The input optical fiber 72 is configured as the same optical fiber as that used in the optical fiber transmission line on which an optical part is arranged as a measured target 74. An incident light control unit 73 is interposed in the input optical fiber 72.

The incident light control unit 73 controls a power and a polarization state of the measured light signal propagating through the input optical fiber 72 and outputs the controlled measured light signal to an input end of the measured target 74 via the input optical fiber 72.

Power dependence of chromatic dispersion in the measured target 74, that is, a relationship between a degree of the chromatic dispersion and the power, can be measured and evaluated by controlling the power of the measured light signal. Further, polarization state dependence of the chromatic dispersion, that is, a relationship between the polarization state and the degree of the chromatic dispersion, can be measured and evaluated by controlling a polarization state of the measured light signal.

The measured target 74 has an output end to which one end of an output optical fiber 75 is connected, and outputs the measured light signal incident from the input end to the output optical fiber 75 via the output end.

The output optical fiber 75 includes the same optical fiber as that used for the optical fiber transmission line on which the optical part is arranged as the measured target 74.

A polarization controller 76 has an input end to which the other end of the output optical fiber 75 is connected and on which the measured light signal from the measured target 74 is incident. Further, the polarization controller 76 has an output end to which one end of an input optical fiber 77 is connected. For the input optical fiber 77, a polarization maintaining fiber is used. The input optical fiber 77 aligns a polarization axis with a polarization axis of the polarization maintaining fibers (the first optical fiber 3 and the second optical fiber 4) in the chromatic dispersion measurement device 78.

The polarization controller 76 converts the polarization state of the measured light signal into linear polarization, aligns the polarization axis with a polarization axis (e.g., a slow axis) of the input optical fiber 77 (the input optical fiber 1 in FIG. 2 or 5), and then outputs the measured light signal to the input optical fiber 77.

Further, the measured target 74 may be a reflective optical part. When the measured target 74 is the reflective optical part, the input end and the output end of the measured target 74 are the same, and the input optical fiber 72 directed to the measured target 74 and the output optical fiber 75 from the measured target 74 are connected via a circulator.

As described above, the device can be miniaturized due to the absence of the space optical system. The device is carried, and thus the change $\Delta\phi(v)$ of the spectral phase with respect to small frequency shift can be measured using a light signal propagating through the optical part that is the measured target as a measured light signal in any place, making it possible to evaluate the chromatic dispersion of the optical part, which is the measurement target, using the light pulse actually propagating through the optical part.

Sixth Preferred Embodiment

Next, a chromatic dispersion measurement device in accordance with the sixth preferred embodiment of the present invention will be described. The chromatic dispersion measurement device in accordance with the sixth preferred embodiment has the same configuration as any one of the first to third preferred embodiments.

In a configuration of the sixth preferred embodiment, control is performed to match the polarization direction of the combined measured light signal incident on the light frequency sweep unit 9 in FIG. 2 with the polarization axis of the band-pass optical filter in the light frequency sweep unit 9, thus improving the spectrum decomposition characteristic. Hereinafter, only different configurations from those in the first and fifth preferred embodiments will be described.

For the light frequency sweep unit 9, a band-pass optical filter having a narrow band-pass frequency width and a high finesse is used in order to improve frequency resolution.

One example of this band-pass optical filter includes an optical element in which a resonator having a higher Q value is provided in an optical fiber.

Thus, when the band-pass optical filter is configured as the optical fiber, it is advantageous to reduce a size and a weight of the chromatic dispersion measurement device of the first to fifth preferred embodiments that have already been described.

Meanwhile, when a polarization non-maintaining fiber (hereinafter, an optical fiber) rather than the polarization maintaining fiber is used in the band-pass optical filter, distortion of the optical fiber due to a fixed state causes polarization dependence in that a refractive index depends on the polarization direction of the incident light. As a result, in the band-pass optical filter, there is a problem in that a band-pass frequency width is spread according to the polarization direction and there are a plurality of band-pass frequency bands rather than one band-pass frequency band depending on the polarization direction.

In order to resolve the problem that the polarization dependence is caused in the band-pass optical filter, a polarization controller is provided in a preceding stage of the light frequency sweep unit configured as the band-pass optical filter to adjust the polarization direction of the incident light to match with a specific polarization axis of the optical fiber constituting the band-pass optical filter and remove the polarization dependence. Here, the polarization controller matches the polarization direction of the incident combined measured light signal with a slow axis of the optical fiber used for the band-pass optical filter.

Figure 8:
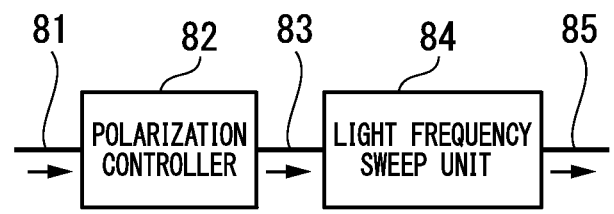
FIG. 8 shows an example of a configuration for adjusting the polarization direction of light incident on a light frequency sweep unit 84 to match a single polarization axis (e.g., a slow axis) of an optical fiber constituting a band-pass optical filter.

FIG. 8 shows an example of configuration for adjusting the polarization direction of the incident light to match a single polarization axis (e.g., a slow axis) of the optical fiber constituting the band-pass optical filter. An optical fiber 81 in FIG. 8 corresponds to the combining optical fiber 6 in FIG. 2, a light frequency sweep unit 84 in FIG. 8 corresponds to the light frequency sweep unit 9 of FIG. 2, and an optical fiber 85 in FIG. 8 is a polarization non-maintaining fiber and corresponds to the output optical fiber 10 in FIG. 2.

In the present embodiment, for control of the polarization, an incident-side optical fiber 81 of FIG. 8 and a connection optical fiber 83 are polarization maintaining fibers. The polarization controller 82 has an input end to which an output end of the optical fiber 81 is connected, and an output end to which an input end of the connection optical fiber 83 is connected. Further, the polarization controller 82 matches the polarization direction of the combined measured light signal incident via the optical fiber 81 with a slow axis of an optical fiber constituting a band-pass optical filter in the light frequency sweep unit 84, and outputs the combined measured light signal to the connection optical fiber 83.

Accordingly, the light frequency sweep unit 84 receives the combined measured light signal whose polarization characteristic matches the slow axis of the optical fiber constituting the internal band-pass optical filter from the optical combination unit 5 via the connection optical fiber 83.

Also, the light frequency sweep unit 84 frequency-decomposes the combined measured light signal by sweeping the band-pass frequency width in the measurement frequency range, and outputs measured component light signals to the light detection unit 11 via the optical fiber 85.

As described above, the polarization controller 82 matches the polarization direction of the combined measured light signal with the polarization axis of the optical fiber constituting the band-pass optical filter in the light frequency sweep unit 84, thereby preventing degradation of spectrum decomposition characteristics due to the polarization direction and improving accuracy of the frequency decomposition characteristic.

Further, the polarization controller 82 may be omitted by adopting the polarization maintaining fiber as the optical fiber 81 when the optical fiber constituting the band-pass optical filter in the light frequency sweep unit 84 is the polarization maintaining fiber. That is, the polarization direction of the incident-side optical fiber 81 may be aligned with and directly connected to the polarization direction of the optical fiber constituting the band-pass optical filter in the light frequency sweep unit 84.

Accordingly, when transmission paths of all lights of the chromatic dispersion measurement device are configured of an optical part based on an optical fiber, it is possible to prevent degradation of the accuracy of the frequency decomposition (a spectrum decomposition characteristic) in the light frequency sweep unit 84.

Seventh Preferred Embodiment

Figure 9:
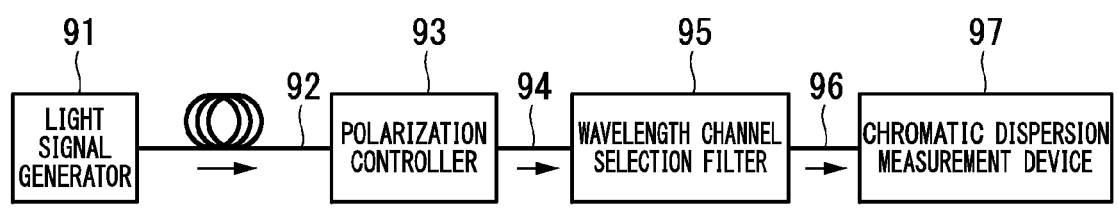
FIG. 9 is a diagram illustrating measurement of a dispersion parameter of a light pulse generated by a light signal generator using the chromatic dispersion measurement device in accordance with any one of the first to third preferred embodiments of the present invention.

Next, a chromatic dispersion measurement device in accordance with a seventh preferred embodiment of the present invention will be described. The chromatic dispersion measurement device in accordance with the seventh preferred embodiment measures the dispersion parameter of the light pulse generated by the light signal generator using the chromatic dispersion measurement device of either one of the first and fifth preferred embodiments. FIG. 9 is a diagram illustrating a method of measuring a dispersion parameter of a light pulse generated by a light signal generator 91, which propagates through a light pulse transmission line, using the chromatic dispersion measurement device in accordance with any one of the first to third preferred embodiments of the present invention.

Further, in FIG. 9, the chromatic dispersion measurement device 97 is the chromatic dispersion measurement device of any one of the first to third preferred embodiments.

A dispersion parameter measurement system shown in FIG. 9 includes the light signal generator 91, an optical fiber transmission line 92, a polarization controller 93, an optical fiber 94, a wavelength channel selection filter 95, an input optical fiber 96 and a chromatic dispersion measurement device 97. For the optical fiber 94 and the input optical fiber 96, polarization maintaining fibers are used.

The light signal generator 91 includes a light transponder/optical transceiver and a wavelength synthesizer, and functions as a light signal generation unit for generating a light pulse in a light transmission device used in an optical network.

Further, the light signal generator 91 has a light output end connected to one end of the optical fiber transmission line 92.

The optical fiber transmission line 92 includes an optical fiber cable used in the optical network as a basic element of a configuration, and has a total length determined according to an optical network that is a use target. For example, in the case of a submarine optical fiber network, a total length of the optical fiber transmission line 92 is 1000 km or more.

Further, when the total length of the optical fiber transmission line 92 becomes greater and an optical relay device is interposed on the transmission line, it is necessary to evaluate a dispersion parameter of a light pulse through an optical relay device. In this case, a device used in the optical relay device, such as an optical amplifier, is interposed in the optical fiber transmission line 92.

In the light signal generator 91 of the present embodiment, the light transponder/optical transceiver includes as a component, for example, a semiconductor laser for continuously generating light, and an optical modulator for coding, that is, modulating output light of the semiconductor laser according to data to be transmitted. The optical modulator uses, for example, 10 Gbps-NRZ (non-return to zero) intensity modulation or 40 Gbps-DQPSK (differential quadrature phase-shift keying) modulation as a data modulation format.

Accordingly, a light signal having the modulation format such as the 10 Gbps-NRZ or the 40 Gbps-DQPSK described above is contained in a measured light signal, which is the measurement target in the present embodiment. However, the measured light signal, which is the measurement target in the present embodiment, is not limited to such a modulation format and the modulation format includes other modulation formats, such as QAM (quadrature amplitude modulation), which are in a research and development stage and will soon be put to practical use.

The optical fiber transmission line 92 has the other end connected to a light input end of the polarization controller 93.

The polarization controller 93 converts a polarization state of an incident measured light signal input from the optical fiber transmission line 92 to the light input end into linear polarization, aligns a polarization axis of the measured light signal with a polarization axis (e.g., a slow axis) of the input optical fiber 96 (the input optical fiber 1 in FIG. 2 or 5), and outputs the measured light signal to the optical fiber 94 having one end connected to a light output end of the polarization controller 93.

The wavelength channel selection filter 95 has a light input end to which the other end of the optical fiber 94 is connected, and receives the measured light signal from the polarization controller 93 via the optical fiber 94.

The wavelength channel selection filter 95 selectively transmits a light signal of a wavelength channel that is a target to be evaluated by the chromatic dispersion measurement device 97 from the incident measured light signal, and outputs the light signal from its light output end as a measured light signal for the chromatic dispersion measurement device 97.

Further, the wavelength channel selection filter 95 is arranged in a subsequent stage of the polarization controller 93 in FIG. 9, but may be arranged in a preceding stage of the polarization controller 93.

That is, when the polarization state of the measured light signal having the polarization axis matching the input optical fiber 96 is greatly changed by the wavelength channel selection filter 95, it is preferable to arrange the polarization controller 93 in a subsequent stage of the wavelength channel selection filter 95 so that the wavelength channel is selected and then a process of aligning the polarization axis of the light signal of the wavelength channel is performed, as described above. In this case, the wavelength channel selection filter 95 is provided between the optical fiber transmission line 92 and the optical fiber 94 and the polarization controller 93 is provided between the optical fiber 94 and the input optical fiber 96. Further, in the case of a configuration in which the polarization controller 93 is arranged in the subsequent stage of the wavelength channel selection filter 95, the optical fiber 94 need not be the polarization maintaining fiber.

According to the chromatic dispersion measurement device in accordance with the present embodiment described above, a chirp characteristic of the light transponder/optical transceiver constituting the light signal generator 91 can be evaluated by changing the frequency channel transmitted by the wavelength channel selection filter 95. When the evaluation of the chirp characteristic (a frequency chirp amount) is performed, a shorter (e.g., a few meters) optical fiber patch cord may be used in place of the optical fiber transmission line 92. The optical fiber patch cord includes an optical fiber, such as standard dispersion single-mode optical fiber or a dispersion shift optical fiber.

Further, the wavelength channel selection filter 95 used in the present embodiment is used to select any frequency of a multiplexed wavelength channel used in wavelength multiplexing transmission, and is available in other preferred embodiments of the present invention.

For example, in the chromatic dispersion measurement device of the sixth preferred embodiment, the measured light signal of any one wavelength channel of the multiplexed wavelength channel can be extracted and a chromatic dispersion characteristic of the one wavelength channel can be evaluated by providing the wavelength channel selection filter 95 in a subsequent stage of the monitoring branch unit 62, that is, between the monitoring branch unit 62 and the chromatic dispersion measurement device 66.

Eighth Preferred Embodiment

Figure 10:
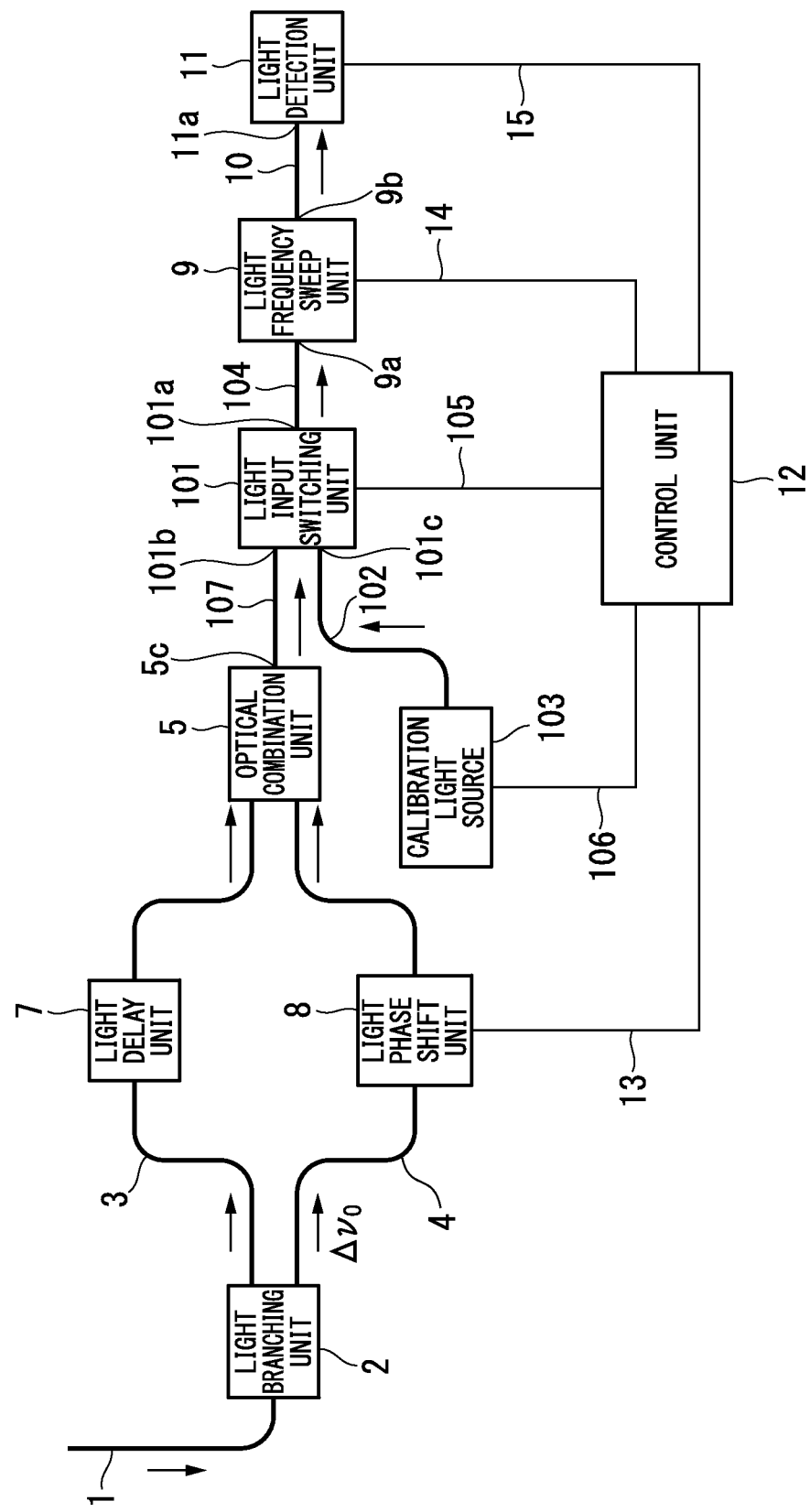
FIG. 10 is a block diagram showing a configuration example of a chromatic dispersion measurement device in accordance with an eighth preferred embodiment of the present invention.

Next, a configuration and functionality of a chromatic dispersion measurement device in accordance with an eighth preferred embodiment of the present invention will be described with reference to FIG. 10. FIG. 10 is a block diagram showing a configuration example of the chromatic dispersion measurement device in accordance with the eighth preferred embodiment of the present invention. The same reference numerals are assigned to the same configurations as those in the first preferred embodiment, and configurations and operations different from those in the first preferred embodiment will be described hereinafter.

In FIG. 10, the chromatic dispersion measurement device of the present embodiment has a configuration in which a light input switching unit 101 is interposed between the optical combination unit 5 and the light frequency sweep unit 9 of the chromatic dispersion measurement device of the first preferred embodiment of FIG. 2. Further, a calibration light source 103 is provided in the chromatic dispersion measurement device of the present embodiment.

Accordingly, in the present embodiment, the combining optical fiber 6 that is the combination path in the chromatic dispersion measurement device in accordance with the first preferred embodiment of FIG. 2 may be replaced with the connection optical fiber 107, the light input switching unit 101, the connection optical fiber 102, the calibration light source 103 and a connection optical fiber 104.

That is, the optical combination unit 5 has a light output end (a third output end) 5c to which one end of the connection optical fiber 107 is connected. The light input switching unit 101 outputs either of light signals incident from two light input ends via a light output end. The light input switching unit 101 has the light output end (a fifth output end) 101a connected to one end of connection optical fiber 104. In the light input switching unit 101, either one (a sixth input end) 101b of the two light input ends is connected to the other end of the connection optical fiber 107, and the other (a seventh input end) 101c of the two light input ends is connected to one end of the connection optical fiber 102. The other end of the optical fiber 104 is connected to an input end 9a of the light frequency sweep unit 9. Further, a control signal for determining either of the light signals incident from the two light input ends to be output from the light output end is supplied from the control unit 12 to the light input switching unit 101 via a light input switching control line 105.

The calibration light source 103 has a light output end connected to the other end of the connection optical fiber 102, and is connected to one end of a calibration light source control line 106 from which a control signal for frequency control from the control unit 12 is supplied. The other end of the calibration light source control line 106 is connected to the control unit 12.

In the chromatic dispersion measurement device described above, the control unit 12 outputs an electrical signal (a control signal) for controlling either one of a measured light signal incident from the optical combination unit 5 via the connection optical fiber 107 and calibration light incident from the calibration light source 103 via the connection optical fiber 102 to be output to the light input end of the light frequency sweep unit 9, to the light input switching unit 101 via the light input switching control line 105.

Also, when the control signal indicating that the calibration light incident from the connection optical fiber 102 is to be output is supplied from the control unit 12, the light input switching unit 101 outputs the calibration light incident from the connection optical fiber 102, from the light output end to the light input end of the light frequency sweep unit 9 via the connection optical fiber 104.

Here, the light frequency sweep unit 9 performs the same process as the frequency sweep for the measured light signal already described in the first preferred embodiment, on the calibration light incident from the connection optical fiber 104 and outputs the measured component light signal obtained by the sweep to the light detection unit 11 via the output light optical fiber 10.

Also, the light detection unit 11 converts the measured component light signal incident from the output light optical fiber 10 into an electrical signal and outputs the converted electrical signal to the control unit 12.

The control unit 12 can perform the calibration of the light frequency frequency-swept by the frequency sweep unit 9 by changing a light frequency of the calibration light output by the calibration light source 103 and measuring the input electrical signal.

For example, for the light frequency sweep unit 9, a tunable optical filter using an optical fiber etalon is used. The tunable optical filter, generally, changes a transmission light frequency of the optical fiber etalon by expanding and contracting the optical fiber by using a piezoelectric element such as PZT (lead zirconate titanate).

In the tunable optical filter using the piezoelectric element, the sweep light frequency varies due to a variation of a driving voltage of the piezoelectric element or a voltage variation of the controller. Accordingly, it is necessary to calibrate a deviation of the sweep light frequency (the transmission frequency) of the tunable optical filter relative to the frequency of the calibration light of the calibration light source 103 in order to remove the frequency variation of component measurement light signal according to the variation of the sweep light frequency.

The calibration light source 103 controls the frequency of the calibration light output to the connection optical fiber 102 according to the control signal (a control command or a control electrical signal) received from the control unit 12 via the calibration light source control line 106.

The control unit 12 synchronizes control for outputting either of the measured light signal and the calibration light in the light input switching unit 101, with the frequency sweep in the light frequency sweep unit 9 and the control of the light frequency of the calibration light of the calibration light source 103. Accordingly, the chromatic dispersion measurement for the measured light signal and the calibration of the frequency of the measured light signal can be alternately performed, and even when the light frequency transmitted by the light frequency sweep unit 9 deviates, the frequency deviation can be calibrated using the calibration light. It is possible to accurately measure the dispersion parameter for each frequency.

The control unit 12 detects that a frequency band transmitted by the light frequency sweep unit 9 varies with each sweep by determining a wavelength at which the intensity is maximized when the calibration light output by the calibration light source 103 is transmitted from the light frequency sweep unit 9.

Further, when the deviation of the light frequency transmitted by the light frequency sweep unit 9 is not great, the calibration of the frequency of the measured light signal may be performed every previously set certain time.

For example, any of the following five configurations in which wavelength calibration and wavelength stabilization control are performed may be used as a configuration of the calibration light source 103.

(1) A configuration including a laser element oscillating in a single longitudinal mode.

(2) A configuration in which a plurality of laser elements oscillating in a single longitudinal mode and having different oscillation wavelengths are used and any of the different oscillation wavelengths is selected by an optical switch.

(3) A configuration in which a tunable laser element oscillating in a single longitudinal mode and having a variable oscillation wavelength is used, and the oscillation wavelength is changed according to a command or an electrical control signal from the control unit 12.

(4) A configuration in which a light signal from a broadband light source is transmitted by an optical filter, and a peak wavelength or a frequency width of the transmitted light is changed according to a command or an electrical control signal from the control unit 12.

(5) A configuration in which a laser element or an optical frequency comb light source in which a longitudinal mode is multi-mode is used, and a frequency period of a peak wavelength is changed according to a command or an electrical control signal from the control unit 12.

Further, the configuration of the light source 103 for the configuration in the present embodiment is not limited to the configurations (1) to (5) described above.

Further, the configuration for adding a functionality of forming the light frequency in the description of the present embodiment has been described based on the chromatic dispersion measurement device in accordance with the first preferred embodiment, but it may be easily applied to the chromatic dispersion measurement devices in accordance with the preferred embodiments other than the first preferred embodiment of the present invention.

While preferred embodiments of the present invention have been described and illustrated above, it should be understood that these are examples of the present invention and are not to be considered as limiting, Additions, omissions, substitutions, and other modifications can be made without departing from the scope of the present invention.

The present invention can be widely applied to, for example, a chromatic dispersion measurement device, and the device can be miniaturized. The measurement of the chromatic dispersion of the light pulse is realized reliably and with high stability without being affected by the non-interference component.

What is claimed is:

1. A chromatic dispersion measurement device comprising:
    an incident path that propagates a measured light signal incident from a measurement target, the incident path including an optical fiber having a polarization maintaining characteristic;
    a light branching unit configured to receive the measured light signal from a first input end connected to the incident path, divide the measured light signal incident from the input end into a first measured light signal and a second measured light signal, output the first measured light signal from a first output end and the second measured light signal having the same polarization direction as the first measured light signal from a second output end, and cause a frequency difference between the first measured light signal and the second measured light signal when the signals are output;
    a first branch path connected to the first output end, the first branch path propagating the first measured light signal, the first branch path including an optical fiber having a polarization maintaining characteristic;
    a second branch path connected to the second output end, the second branch path propagating the second measured light signal, the second branch path including an optical fiber having a polarization maintaining characteristic;
    an optical phase shifter provided in either one of the first branch path and the second branch path, the optical phase shifter periodically changing a phase $\alpha_i$ (in radians; $\alpha_i$ is a real number for which $0 \leq \alpha_i \leq 2\pi$, while i is an integer for which $3 \leq i$) of the measured light signal propagating through the branch path in which the optical phase shifter is provided;
    an optical combination unit configured to combine the first measured light signal incident from a second input end connected to the first branch path and the second measured light signal incident from a third input end connected to the second branch path, the optical combination unit outputting an interference element of an i-th optical component obtained by interference of the first measured light signal and the second measured light signal when the phase difference is the phase $\alpha_i$, as a combined measured light signal, from a third output end;
    a combination path connected to the third output end, the combination path including an optical fiber that propagates the combined measured light signal;
    a tunable band pass filter configured to receive the combined measured light signal from a fourth input end connected to the combination path, perform a sweep of a frequency in a frequency range for passing the combined measured light signal, perform frequency decomposition to extract a spectral component in the frequency range from the combined measured light signal, and output the result of the frequency decomposition as a measured component light signal from a fourth output end;

an output light path connected to the fourth output end, the output light path including an optical fiber that propagates the measured component light signal;

a light detection unit configured to receive the measured component light signal from a fifth input end connected to the output light path, converts the measured component light signal into an electrical signal, and uses the conversion result as an interference signal; and a control unit configured to perform a process of sequentially acquiring the interference signal corresponding to the i-th optical component in order of increase of i in one period in which the phase of the optical phase shifter is changed in synchronization with the sweep of the frequency in the frequency range.

2. The chromatic dispersion measurement device according to claim 1, wherein, when a range of acquired values of i is m, the control unit sets the number of data points of all interference signals to m times by performing an interpolation process in which a measurement interval for each frequency component is 1/m, on each of the i-th optical components.

3. The chromatic dispersion measurement device according to claim 1, wherein a total number of elements of $\alpha_i$ is equal to or greater than 3 (i≥3), and the control unit is configured to extract, from the elements, a first optical component of a phase $\alpha_1$, a second optical component of a phase $\alpha_2$ and a third optical component of a phase $\alpha_3$ as three elements, and acquire the interference signal from each of the first optical component, the second optical component and the third optical component.

4. The chromatic dispersion measurement device according to claim 3, wherein a total number of elements of $\alpha_i$ is equal to or greater than 20 (i≥20).

5. The chromatic dispersion measurement device according to claim 3, wherein the control unit comprises:

a first receiving unit configured to receive the interference signal of the first optical component;

a second receiving unit configured to receive the interference signal of the second optical component; and a third receiving unit configured to receive the interference signal of the third optical component.

6. The chromatic dispersion measurement device according to claim 3, wherein the control unit is configured to sequentially acquire, as a measurement unit, the first optical component, the second optical component, and the third optical component as a data set in each sweep of a measurement frequency in a measurement range.

7. The chromatic dispersion measurement device according to claim 1, further comprising:

a light delay unit provided in either one of the first branch path and the second branch path, the light delay unit being configured to adjust an optical path length difference between the first branch path and the second branch path.

8. The chromatic dispersion measurement device according to claim 7, wherein the light delay unit is provided in either one of the first branch path and the second branch path, and the optical phase shifter is provided in the other branch path.

9. The chromatic dispersion measurement device according to claim 7, wherein the light delay unit and optical phase shifter are integrally provided in either one of the first branch path and the second branch path.

10. The chromatic dispersion measurement device according to claim 7, wherein the control unit comprises:

a first receiving unit configured to receive the interference signal of the first optical component;

a second receiving unit configured to receive the interference signal of the second optical component; and a third receiving unit configured to receive the interference signal of the third optical component.

11. The chromatic dispersion measurement device according to claim 7, wherein the control unit is configured to sequentially acquire, as a measurement unit, the first optical component, the second optical component, and the third optical component as a data set in each sweep of a measurement frequency in a measurement range.

12. The chromatic dispersion measurement device according to claim 1, further comprising:

a calibration light source that outputs calibration light; and a light input switching unit configured to receive the combined light signal output from the output end of the light combination unit from a sixth input end via an optical fiber, receive the calibration light from a seventh input end, and select either one of the combined light signal and the calibration light to output the one of the combined light signal and the calibration light from the fifth output end, wherein the light input switching unit is interposed between the light combination unit and the tunable band pass filter, and the one of the combined light signal and the calibration light output from the light input switching unit is input to the fourth input end of the frequency sweep unit via an optical fiber.

13. The chromatic dispersion measurement device according to claim 1, wherein the combination path includes an optical fiber having a polarization maintaining characteristic, a controller that controls the polarization direction of the combined measured light signal is inserted in a subsequent stage of the combination path, and the polarization controller and the tunable band pass filter are connected to each other by an optical fiber having a polarization maintaining characteristic.

* * * * *